US012800874B2

(12) United States Patent
Zhao et al.

(10) Patent No.: US 12,800,874 B2
(45) Date of Patent: Nov. 17, 2026

(54) REFLECTION DRIVING MECHANISM AND CAMERA MODULE

(71) Applicant: NINGBO SUNNY OPOTECH CO., LTD, Yuyao City Ningbo (CN)

(72) Inventors: Bojie Zhao, Yuyao City (CN); Lifeng Yao, Yuyao City (CN)

(73) Assignee: NINGBO SUNNY OPOTECH CO., LTD, Yuyao (CN)

( * ) Notice: Subject to any disclaimer, the term of this patent is extended or adjusted under 35 U.S.C. 154(b) by 217 days.

(21) Appl. No.: 18/838,382

(22) PCT Filed: Feb. 17, 2023

(86) PCT No.: PCT/CN2023/076835
§ 371 (c)(1),
(2) Date: Aug. 14, 2024

(87) PCT Pub. No.: WO2023/155894
PCT Pub. Date: Aug. 24, 2023

(65) Prior Publication Data

US 2025/0147271 A1 May 8, 2025

(30) Foreign Application Priority Data

Feb. 18, 2022 (CN) ......................... 202210153505.6
Feb. 18, 2022 (CN) ......................... 202210153530.4

(51) Int. Cl.
*G02B 7/18* (2021.01)
*G02B 7/182* (2021.01)
(Continued)

(52) U.S. Cl.
CPC ....... *G02B 7/1821* (2013.01); *G02B 13/0065* (2013.01); *G02B 27/646* (2013.01); *G03B 17/12* (2013.01); *G03B 17/17* (2013.01)

(58) Field of Classification Search
CPC ......................... G02B 7/1821; G02B 13/0065; G02B 27/646; G02B 7/1828; G03B 17/12;
(Continued)

(56) References Cited

U.S. PATENT DOCUMENTS

2019/0228562 A1* 7/2019 Song ........................ G03B 5/02
2020/0363626 A1* 11/2020 Seo ........................ G03B 30/00
(Continued)

FOREIGN PATENT DOCUMENTS

CN 107515459 A 12/2017
CN 207937704 U 10/2018
(Continued)

OTHER PUBLICATIONS

The International Search Report (PCT/ISA/210) issued in PCT/CN2023/076835, mailed on Jun. 13, 2023.
(Continued)

*Primary Examiner* — Euncha P Cherry
(74) *Attorney, Agent, or Firm* — Birch, Stewart, Kolasch & Birch, LLP

(57) ABSTRACT

Disclosed are a reflection driving mechanism and a camera module. The reflection driving mechanism drives the reflective element of the camera module to rotate through a compact structural arrangement to achieve optical image stabilization of the camera module. Furthermore, the reflective stabilization mechanism has a relatively small size, which is conducive to the miniaturization of the camera module.

17 Claims, 10 Drawing Sheets

(51) Int. Cl.

| | |
|---|---|
| ***G02B 13/00*** | (2006.01) |
| ***G02B 27/64*** | (2006.01) |
| ***G03B 17/12*** | (2021.01) |
| ***G03B 17/17*** | (2021.01) |

(58) Field of Classification Search

CPC ............ G03B 17/17; G03B 2205/0023; G03B 2205/0069; G03B 30/00; G03B 5/00; H04N 23/50; H04N 23/686

See application file for complete search history.

(56) References Cited

U.S. PATENT DOCUMENTS

| | | | | |
|---|---|---|---|---|
| 2021/0199983 A1 | 7/2021 | Kazuo | | |
| 2021/0368078 A1 | 11/2021 | Iwase et al. | | |
| 2023/0296962 A1* | 9/2023 | Lee | G03B 3/10 | 359/557 |

FOREIGN PATENT DOCUMENTS

| | | | |
|---|---|---|---|
| CN | 109343294 | A | 2/2019 |
| CN | 111142308 | A | 5/2020 |
| CN | 210982888 | U | 7/2020 |
| CN | 212410942 | U | 1/2021 |
| CN | 112532816 | A | 3/2021 |
| CN | 113193720 | A | 7/2021 |
| KR | 10-2021-0013280 | A | 2/2021 |
| WO | WO 2020/082425 | A1 | 4/2020 |

OTHER PUBLICATIONS

Extended European Search Report for European Application No. 23755895.2, dated Apr. 11, 2025.

* cited by examiner

REFLECTION DRIVING MECHANISM AND CAMERA MODULE

CROSS REFERENCE TO RELATED APPLICATIONS

This application is the National Phase of PCT International Application No. PCT/CN2023/076835, filed on Feb. 17, 2023, which claims priority under 35 U.S.C. 119(a) to patent application No. 202210153505.6, filed in China on Feb. 18, 2022, and patent application No. 202210153530.4, filed in China on Feb. 18, 2022, all of which are hereby expressly incorporated by reference into the present application.

TECHNICAL FIELD

The present application relates to the field of camera modules, and in particular to a reflection driving mechanism and a camera module.

BACKGROUND

With the popularity of mobile electronic devices, the relevant technologies of camera modules used in mobile electronic devices to help users obtain images have been rapidly developed and improved. Camera modules have been widely installed in mobile electronic devices such as tablet computers, laptops and smart phones, and Auto Focus (AF) function, Optical Image Stabilization (OIS) function, zoom function, etc. have been added to camera modules for mobile terminals to meet consumers' increasingly diverse requirements for camera module functions.

However, in order to achieve various functions, the structure of the camera module has become complicated and the size has increased accordingly, resulting in an increase in the size of mobile electronic devices equipped with camera modules. In addition, when it is necessary to drive one of the components in the camera module to move, the weight of the component itself and the weight of other components fixed to the component should also be considered. Driving heavier objects requires greater driving force and higher power consumption.

Therefore, an optimized stabilization solution and a corresponding camera module structure are expected.

DISCLOSURE

An advantage of the present application is to provide a reflection driving mechanism and a camera module. The reflection driving mechanism drives the reflective element of the camera module to rotate through a compact structural arrangement to achieve optical image stabilization of the camera module. In particular, the reflective stabilization mechanism has a relatively small size, which is conducive to the miniaturization of the camera module.

Other advantages and features of the present application will become apparent from the following description, and may be achieved by the means and combinations particularly pointed out in the claims.

To achieve at least one of the above advantages, the present application provides a reflection driving mechanism, comprising:

a reflection drive housing having a receiving cavity formed therein and a light inlet and a light outlet communicated with the receiving cavity;

a rotation support assembly;

a support frame rotatably mounted in the receiving cavity through the rotation support assembly, wherein the support frame has at least one support groove recessedly formed on its top surface;

a bearing seat rotatably mounted on the support frame, wherein the bearing seat comprises a bearing body and at least one rotation axis protruding and extending laterally from the bearing body, the bearing body has a mounting portion suitable for mounting a reflective element thereon, and the at least one rotation axis is fittedly mounted in the at least one support groove, so that the bearing seat can rotate relative to the support frame through the pivot connection between the at least one rotation axis and the at least one support groove; and a driving unit, wherein the driving unit is suitable for driving the bearing seat to rotate relative to the support frame around a first axis set by the at least one rotation axis, and the driving unit is suitable for driving the bearing seat to rotate relative to the reflection drive housing around a second axis perpendicular to the first axis so as to drive the support frame to rotate relative to the reflection drive housing around the second axis through the pivot connection between the bearing seat and the support frame.

In the reflection driving mechanism according to the present application, the at least one rotation axis comprises a first rotation axis and a second rotation axis extending outward from opposite sides of the bearing body, respectively, and the first rotation axis and the second rotation axis are coaxially arranged, and the at least one support groove comprises a first support groove and a second support groove recessedly formed on the top surface of the support frame, and the first support groove and the second support groove are coaxially arranged, wherein the first rotation axis is fitted in the first support groove, and the second rotation axis is fitted in the second support groove.

In the reflection driving mechanism according to the present application, the first rotation axis and the second rotation axis are located on the top of the bearing body.

In the reflection driving mechanism according to the present application, the support frame comprises a first support portion, a second support portion, and a frame connecting portion extending between the first support portion and the second support portion, wherein the first support groove is recessedly formed on the top surface of the first support portion, and the second support groove is recessedly formed on the top surface of the second support portion.

In the reflection driving mechanism according to the present application, the outer surface of the first rotation axis contacts at least two surfaces of the first support groove, and the outer surface of the second rotation axis contacts at least two surfaces of the second support groove.

In the reflection driving mechanism according to the present application, the reflection driving mechanism further comprises a first rotation limiting portion for limiting the rotation angle of the bearing seat relative to the support frame.

In the reflection driving mechanism according to the present application, the rotation support assembly comprises a rotation track formed between the support frame and the reflection drive housing and at least three balls arranged in the rotation track.

In the reflection driving mechanism according to the present application, the reflection driving mechanism further comprises a second rotation limiting portion for limiting a rotation angle of the support frame relative to the reflection drive housing.

In the reflection driving mechanism according to the present application, the driving unit comprises a first driving magnet and a second driving magnet disposed on the bottom surface of the bearing body, and a first driving coil and a second driving coil disposed in the reflection drive housing and corresponding to the first driving magnet and the second driving magnet, respectively. The first driving magnet and the first driving coil constitute a first coil-magnet pair, and the second driving magnet and the second driving coil constitute a second coil-magnet pair.

In the reflection driving mechanism according to the present application, the reflection drive housing comprises an upper cover and a base that are interlocked with each other, the base has a substrate through hole formed through the bottom thereof, the driving unit also comprises a reflection part circuit board fixed in the substrate through hole, and the first driving coil and the second driving coil are electrically connected to the reflection part circuit board.

In the reflection driving mechanism according to the present application, the first coil-magnet pair and the second coil-magnet pair are arranged symmetrically relative to a central axis set by the bearing body.

In the reflection driving mechanism according to the present application, the combined force of a first force acting on the bearing seat generated by the first coil-magnet pair and a second force acting on the bearing seat generated by the second coil-magnet pair determines the movement of the bearing seat relative to the support frame, and the difference between a first torque acting on the bearing seat generated by the first coil-magnet pair and a second torque acting on the bearing seat generated by the second coil-magnet pair determines the movement of the bearing seat and the support frame relative to the reflection drive housing.

In the reflection driving mechanism according to the present application, the reflection driving mechanism further comprises a reflection part magnetic attraction component for attracting the bearing seat and the support frame to the reflection drive housing. The reflection part magnetic attraction component comprises a frame magnetic attraction magnet fixed to the support frame and a reflection part magnetic conductive sheet arranged on the reflection drive housing, so that the support frame is attracted to the reflection drive housing through the magnetic attraction force between the frame magnetic attraction magnet and the reflection part magnetic conductive sheet and the magnetic attraction force in between the first and second driving magnets and the reflection part magnetic conductive sheet, and the bearing seat is attracted to the reflection drive housing through the magnetic attraction force between the first and second driving magnets and the reflection part magnetic conductive sheet.

In the reflection driving mechanism according to the present application, the reflection driving mechanism also comprises a spring sheet, which comprises an outer fixing portion fixed to the top surface of the support frame, an inner fixing portion fixed to the top surface of the bearing seat, and a spring wire portion extending between the inner fixing portion and the outer fixing portion.

In the reflection driving mechanism according to the present application, the bearing seat is centrally held in the support frame by the spring sheet.

In the reflection driving mechanism according to the present application, the outer fixing portion comprises a first outer fixing portion, a second outer fixing portion, a third outer fixing portion and a fourth outer fixing portion, the inner fixing portion comprises a first inner fixing portion, a second inner fixing portion, a third inner fixing portion and a fourth inner fixing portion, and the spring wire portion comprises a first spring wire and a second spring wire. The first outer fixing portion and the second outer fixing portion are fixed to a side of the top surface of the first support portion, the first inner fixing portion and the second inner fixing portion are fixed to a side of the top surface of the bearing seat, and the first spring wire connects the first outer fixing portion, the second outer fixing portion, the first inner fixing portion and the second inner fixing portion to form a first spring sheet part; the third outer fixing portion and the fourth outer fixing portion are fixed to the opposite other side of the top surface of the second support portion, the third inner fixing portion and the fourth inner fixing portion are fixed to the opposite other side of the top surface of the bearing seat, and the second spring wire connects the third outer fixing portion, the fourth outer fixing portion, the third inner fixing portion and the fourth inner fixing portion to form a second spring sheet part, wherein the first spring sheet part and the second spring sheet part are arranged symmetrically with respect to the second axis.

In the reflection driving mechanism according to the present application, the first spring wire is provided with a first spring wire rotation axis, the first spring wire is symmetrical about the first spring wire rotation axis, the second spring wire is provided with a second spring wire rotation axis, the second spring wire is symmetrical about the second spring wire rotation axis, wherein the first spring wire rotation axis and the second spring wire rotation axis are in the same direction as the first axis.

The present application provides a reflection driving mechanism, comprising

- a reflection drive housing having a receiving cavity formed therein and a light inlet and a light outlet communicated with the receiving cavity;
- a support frame rotatably mounted in the receiving cavity;
- a bearing seat rotatably mounted on the support frame; and
- a driving unit comprising a first driving magnet and a second driving magnet disposed on the bearing seat, and a first driving coil and a second driving coil disposed on the reflection drive housing and corresponding to the first driving magnet and the second driving magnet, respectively, wherein the first driving magnet and the first driving coil constitute a first coil-magnet pair, and the second driving magnet and the second driving coil constitute a second coil-magnet pair.

In the reflection driving mechanism according to the present application, the first coil-magnet pair and the second coil-magnet pair are arranged symmetrically relative to the central axis set by the bearing seat.

In the reflection driving mechanism according to the present application, the first coil-magnet pair and the second coil-magnet pair are suitable for cooperating to drive the bearing seat to rotate around a first axis relative to the support frame, and the first coil-magnet pair and the second coil-magnet pair are suitable for cooperating to drive the bearing seat to rotate around a second axis perpendicular to the first axis relative to the reflection drive housing so as to drive the support frame to rotate around the second axis relative to the reflection drive housing through the pivot connection between the bearing seat and the support frame.

In the reflection driving mechanism according to the present application, the combined force of the first force acting on the bearing seat generated by the first coil-magnet pair and the second force acting on the bearing seat generated by the second coil-magnet pair determines the movement of the bearing seat relative to the support frame, and the difference between the first torque acting on the bearing seat generated by the first coil-magnet pair and the second torque acting on the bearing seat generated by the second coil-magnet pair determines the movement of the bearing seat and the support frame as a whole relative to the reflection drive housing.

In the reflection driving mechanism according to the present application, the reflection drive housing comprises an upper cover and a base that are interlocked with each other, the base has a substrate through hole formed through the bottom thereof, the driving unit also comprises a reflection part circuit board fixed in the substrate through hole, and the first driving coil and the second driving coil are electrically connected to the reflection part circuit board.

In the reflection driving mechanism according to the present application, the driving unit comprises a third driving magnet disposed on the bearing seat and located between the first driving magnet and the second driving magnet, and a third driving coil disposed on the reflection drive housing and corresponding to the third driving magnet, wherein the third driving coil is located between the first driving coil and the second driving coil, wherein the third driving coil and the third driving magnet constitute the third coil-magnet pair.

In the reflection driving mechanism according to the present application, the first coil-magnet pair and the second coil-magnet pair are symmetrically distributed relative to the third coil-magnet pair.

In the reflection driving mechanism according to the present application, the third coil-magnet pair is suitable for driving the bearing seat to rotate around a first axis relative to the support frame, and the first coil-magnet pair and the second coil-magnet pair are suitable for cooperating to drive the bearing seat to rotate around a second axis perpendicular to the first axis relative to the reflection drive housing so as to drive the support frame to rotate around the second axis relative to the reflection drive housing through the pivot connection between the bearing seat and the support frame.

In the reflection driving mechanism according to the present application, the difference between the first torque generated by the first coil-magnet pair acting on the bearing seat and the second torque generated by the second coil-magnet pair acting on the bearing seat determines the movement of the bearing seat and the support frame as a whole relative to the reflection drive housing, wherein the direction of the first force acting on the bearing seat generated by the first coil-magnet pair is opposite to the direction of the second force acting on the bearing seat generated by the second coil-magnet pair.

In the reflection driving mechanism according to the present application, the magnitude of the first force is equal to the magnitude of the second force.

In the reflection driving mechanism according to the present application, the first driving coil and the second driving coil are connected in series, the winding direction of the first driving coil is opposite to the winding direction of the second driving coil, and the magnetic poles of the first driving magnet and the second driving magnet are oriented in the same direction.

In the reflection driving mechanism according to the present application, the first driving coil and the second driving coil are connected in series, the winding direction of the first driving coil is the same as the winding direction of the second driving coil, and the magnetic poles of the first driving magnet and the second driving magnet are in opposite directions.

In the reflection driving mechanism according to the present application, the % reflection driving mechanism also comprises a rotation support assembly, and the support frame is rotatably installed in the receiving cavity through the rotation support assembly, the support frame has at least one support groove recessedly formed on its top surface, the bearing seat comprises a bearing body and at least one rotation axis protruding and extending laterally from the bearing body, the bearing body has a mounting portion suitable for mounting a reflective element thereon, and the at least one rotation axis is fitfully installed in the at least one support groove, so that the bearing seat can be rotated relative to the support frame through the pivot connection between the at least one rotation axis and the at least one support groove.

In the reflection driving mechanism according to the present application, the at least one rotation axis comprises a first rotation axis and a second rotation axis extending outward from opposite sides of the bearing body, respectively, and the first rotation axis and the second rotation axis are coaxially arranged, and the at least one support groove comprises a first support groove and a second support groove recessedly formed on the top surface of the support frame, and the first support groove and the second support groove are coaxially arranged, wherein the first rotation axis is fitted in the first support groove, and the second rotation axis is fitted in the second support groove, wherein the first rotation axis and the second rotation axis are located on the top of the bearing body.

In the reflection driving mechanism according to the present application, the support frame comprises a first support portion, a second support portion, and a frame connecting portion extending between the first support portion and the second support portion, wherein the first support groove is recessedly formed on the top surface of the first support portion, and the second support groove is recessedly formed on the top surface of the second support portion.

In the reflection driving mechanism according to the present application, the reflection driving mechanism further comprises a first rotation limiting portion for limiting the rotation angle of the bearing seat relative to the support frame, and a second rotation limiting portion for limiting the rotation angle of the support frame relative to the reflection drive housing.

In the reflection driving mechanism according to the present application, the reflection driving mechanism further comprises a reflection part magnetic attraction component for attracting the bearing seat and the support frame to the reflection drive housing. The reflection part magnetic attraction component comprises a frame magnetic attraction magnet fixed to the support frame and a reflection part magnetic conductive sheet arranged on the reflection drive housing, so that the support frame is attracted to the reflection drive housing through the magnetic attraction force between the frame magnetic attraction magnet and the reflection part magnetic conductive sheet and the magnetic attraction force between the first and second driving magnets and the reflection part magnetic conductive sheet, and the bearing seat is attracted to the reflection drive housing through the magnetic attraction force between the first and second driving magnets and the reflection part magnetic conductive sheet.

In the reflection driving mechanism according to the present application, the reflection driving mechanism further comprises a spring sheet, which comprises an outer fixing portion fixed to the top surface of the support frame, an inner fixing portion fixed to the top surface of the bearing seat, and a spring wire portion extending between the inner fixing portion and the outer fixing portion, wherein the bearing seat is centrally held in the support frame by the spring sheet.

According to another aspect of the present application, a camera module is also provided, comprising:

- a reflection driving mechanism as described above;
- a reflective element mounted on the reflection driving mechanism;
- a lens module held on a light reflection path of the reflective element; and
- a photosensitive assembly arranged on the light propagation path of the lens module.

Further objectives and advantages of the present application will be fully reflected through understanding of the following description and drawings.

These and other objects, features and advantages of the present application are fully reflected in the following detailed description, drawings and claims.

BRIEF DESCRIPTION OF THE DRAWINGS

By describing the embodiments of the present application in more detail in conjunction with the accompanying drawings, the above and other objects, features and advantages of the present application will become more apparent. The accompanying drawings are used to provide further understanding of the embodiments of the present application and constitute a part of the specification. They are used together with the embodiments of the present application to explain the present application and do not constitute a limitation to the present application. In the drawings, the same reference numerals generally refer to the same components or steps.

DETAILED DESCRIPTION

Hereinafter, exemplary embodiments according to the present application will be described in detail with reference to the accompanying drawings. Obviously, the described embodiments are only some embodiments of the present application, rather than all embodiments of the present application. It should be understood that the present application is not limited to the example embodiments described herein.

Exemplary Camera Module

Figure 1A:
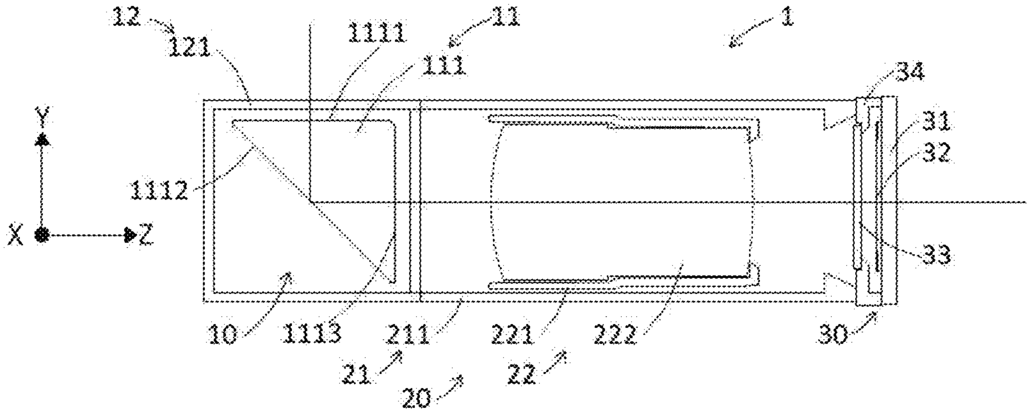
FIG. 1A shows a schematic view of a camera module according to an embodiment of the present application.
Figure 1B:
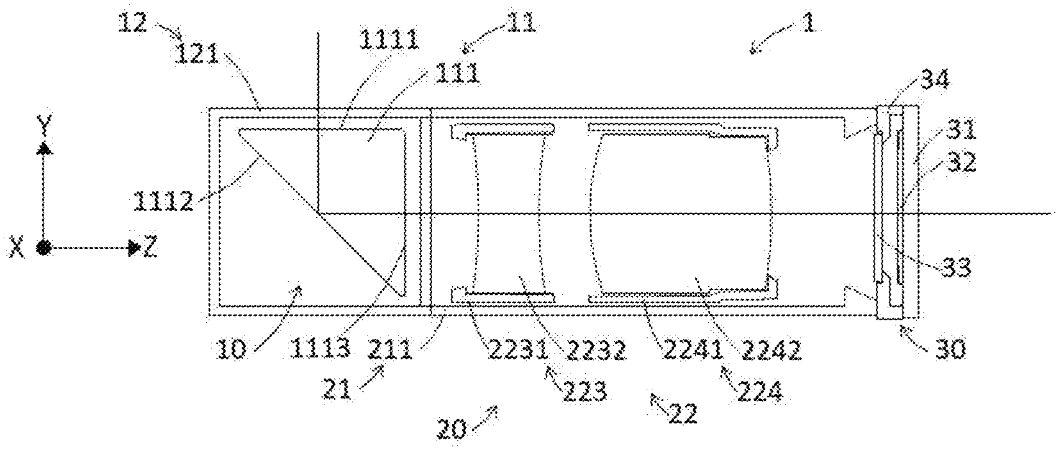
FIG. 1B shows a schematic view of another embodiment of a camera module according to an embodiment of the present application.
Figure 1C:
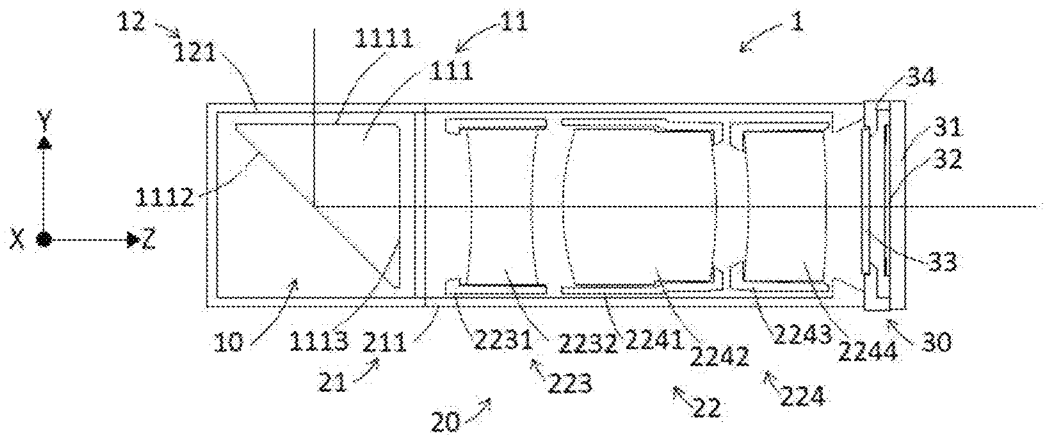
FIG. 1C shows a schematic view of another embodiment of a camera module according to an embodiment of the present application.

As shown in FIG. 1A to FIG. 1C, a camera module according to an embodiment of the present application is illustrated, which comprises a reflection module 10, a lens module 20 and a photosensitive assembly 30. The reflection module 10 is used to change the propagation direction of the imaging light from the object to be photographed so that the imaging light points to the lens module 20, the lens module 20 is used to converge the imaging light on the photosensitive assembly 30, and the photosensitive assembly 30 is used to output the resulting image. That is to say, in the embodiment of the present application, the function of the reflection module 10 is to redirect the imaging light from the object to be photographed. The lens module 20 is maintained on the reflection path of the reflection module 10 for receiving the imaging light from the reflection module 10, and the photosensitive assembly 30 is maintained on the light propagation path of the lens module 20 for receiving the imaging light from the lens module 20.

Accordingly, the reflection module 10 comprises a reflection driving mechanism 12 and a reflective element 11 attached to the reflection driving mechanism 12. The reflective element 11 is suitable for reflecting light to fold the imaging optical path of the camera module 1, thereby reducing the overall height of the camera module 1 so that the camera module 1 can be placed horizontally in a mobile electronic device. In a specific example, the reflective element 11 is suitable for deflecting the incident imaging light by 90 degrees and then making it incident on the lens module 20. It is worth mentioning that, considering the manufacturing tolerance, the angle at which the reflective element 11 deflects the imaging light may have an error within 1°, which should be understandable to those skilled in the art.

In a specific embodiment, the reflective element 11 may be implemented as a reflector or a prism (e.g., a triangular prism). The reflection driving mechanism 12 is suitable for driving the reflective element 11 to move, thereby changing the propagation path of the imaging light, and further realizing the stabilization function of the camera module 1. In an embodiment of the present application, with the optical axis direction of the lens module 20 as the Z-axis direction, the reflection driving mechanism 12 is suitable for driving the reflective element 11 to rotate around a first axis 122X (X-axis) perpendicular to the optical axis (Z-axis) and around a second axis 123Y (Y-axis) perpendicular to both the optical axis (Z-axis) and the first axis 122X (X-axis).

Correspondingly, when the reflective element 11 is implemented as a prism 111, the prism 111 comprises a light incident surface 1111, a light reflecting surface 1112 and a light exiting surface 1113. The light incident surface 1111 of the prism 111 and its light exiting surface 1113 are perpendicular to each other, and the light reflecting surface 1112 of the prism 111 is inclined at an angle of 45° to the light incident surface 1111 and the light exiting surface 1113. In this way, the imaging light can make a 90° turn at the light reflecting surface 1112 and be output from the light exiting surface 1113 in a manner perpendicular to the light exiting surface 1113.

The lens module 20 comprises an optical lens 22, the optical axis of the optical lens 22 is the optical axis of the lens module 20, and the optical axis of the optical lens 22 is arranged along the Z-axis direction. The light reflected by the reflection module 10 is incident on the optical lens 22 and converged to the photosensitive assembly 30 through the optical lens 22.

In an embodiment of the present application, the optical lens 22 has a fixed focal length, as shown in FIG. 1A, the optical lens 22 comprises a lens barrel 221 and a lens group 222 accommodated in the lens barrel 221, the lens group 222 comprises at least one lens, and the optical lens 22 can move along the optical axis direction of the optical lens 22 relative to the photosensitive assembly 30, and can also move along the direction perpendicular to the optical axis of the optical lens 22.

In other embodiments of the present application, the optical lens 22 has a variable focal length (i.e., the focal length of the lens module 20 is variable), as shown in FIGS. 1B and 1C, the optical lens 22 comprises at least one fixed group 223 and at least one movable group 224, the at least one fixed group 223 is fixed at a distance relative to the photosensitive assembly 30 along the optical axis direction of the optical lens 22, and the at least one movable group 224 is adjustable at a distance relative to the at least one fixed group 223 or the photosensitive assembly 30 along the optical axis direction of the optical lens 22. Specifically, referring to FIG. 1B, the optical lens 22 comprises a fixed group 223 and a movable group 224, the fixed group 223 comprises a first lens barrel 2231 and a first lens group 2232 accommodated in the first lens barrel 2231, the first lens group 2232 comprises at least one lens, and the movable group 224 comprises a second lens barrel 2241 and a second lens group 2242 accommodated in the second lens barrel 2241, the second lens group 2242 comprises at least one lens. In the optical axis direction of the optical lens 22, the position of the fixed group 223 relative to the photosensitive assembly 30 is fixed, and the position of the movable group 224 relative to the fixed group 223 is adjustable, so that the focal length of the optical lens 22 is adjustable. Further, referring to FIG. 1C, the movable group 224 also comprises a third lens barrel 2243 and a third lens group 2244 accommodated in the third lens barrel 2243, and the third lens group 2244 comprises at least one lens. In other words, in the embodiment shown in FIG. 1C, the optical lens 22 comprises a fixed group 223 and two movable groups 224, and the positions of the two movable groups 224 relative to the fixed group 223 in the optical axis direction of the optical lens 22 can be adjusted, respectively. The two movable group 224 comprises a zoom group and a focus group. In a specific example, the zoom group is arranged between the fixed group 223 and the focus group. In another specific example, the focus group is set between the fixed group 223 and the zoom group, but the present application is not limited thereto. In the present application, the fixed group 223 and the movable group 224 of the optical lens 22 may also be other numbers, which can be set according to the imaging requirements of the camera module 1.

The lens module 20 may further include a lens driving mechanism. The optical lens 22 is installed in the lens driving mechanism 21, and the lens driving mechanism 21 is suitable for driving the optical lens 22 to move, changing the propagation path of the imaging light, and then realizing functions such as stabilization, focus, zoom and the like. Referring to FIG. 1A, the lens driving mechanism 21 is suitable for driving the optical lens 22 to move along its optical axis to achieve a focusing function, or to drive the optical lens 22 to move perpendicular to its optical axis to achieve a stabilization function. Referring to FIG. 1B, the lens driving mechanism 21 is suitable for driving the movable group 224 to move along the optical axis direction of the optical lens 22 to adjust the focal length of the optical lens 22. Referring to FIG. 1C, the lens driving mechanism 21 is adapted to respectively drive the two movable groups 224 (the zoom group and the focus group) to move along the optical axis direction of the optical lens 22 to achieve an optical zoom function.

In the embodiment of the present application, the photosensitive assembly 30 comprises a photosensitive circuit board 31 and a photosensitive chip 32 mounted on the photosensitive circuit board 31, electronic components (not shown in the figures), a filter element bracket 34 and a filter element 33. In some examples of the present application, the photosensitive chip 32 is fixed to the photosensitive circuit board 31 and electrically connected to the photosensitive circuit board 31 by, for example, bonding, so that the photosensitive chip 32 receives imaging light for imaging and is electrically connected to the mobile electronic device through the photosensitive circuit board 31. In some examples of the present application, the filter element bracket 34 is fixed to the photosensitive circuit board 31 by, for example, bonding, and the filter element 33 is fixed to the filter element bracket 34 by, for example, bonding, so as to be maintained on the photosensitive path of the photosensitive chip 32, and the filter element 33 filters the imaging light entering the photosensitive chip 32.

In some examples of the present application, the photosensitive assembly 30 and the lens module 20 are fixed to each other, and the reflection module 10 and the lens module 20 are fixed to each other, thereby forming a periscope camera module 1 with a stabilization function. Specifically, the photosensitive assembly 30 is fixed to the lens drive housing 211 of the lens module 20 through the filter element bracket 34, for example, by bonding, and the reflection module 10 is fixed to the lens drive housing 211 of the lens module 20 through the reflection drive housing 121 of the reflection module 10 (for example, the reflection drive housing 121 of the reflection module 10 and the lens drive housing 211 are bonded and fixed to each other through an adhesive medium, or the reflection drive housing 121 and the lens drive housing 211 are fixed by integral molding). In other words, the reflection module 10 and the lens drive module 20 use the same housing, and the reflective element 11 and the optical lens 22 are installed in the same housing to form an integrated periscope camera module 1.

As mentioned above, in order to realize the stabilization of the camera module 1 by utilizing the movement of the reflective element 11, the reflection driving mechanism 12 is required to drive the reflective element 11 to change the propagation path of the imaging light. To this end, the present application provides a reflection driving mechanism 12 suitable for driving the reflective element 11 to rotate, so that while achieving the stabilization function, the size of the reflection driving mechanism 12 is relatively small, which can maintain the miniaturization of the camera module 1.

Exemplary Reflection Driving Mechanism 12

As shown in FIG. 2 to FIG. 11B, the reflection driving mechanism 12 according to the embodiment of the present application is illustrated. In the present application, the reflection driving mechanism 12 comprises a reflection drive housing 121, a bearing seat 122, a support frame 123, a spring sheet 124, a driving unit 125, a reflection part magnetic attraction component 127 and a rotation support assembly 128.

For the sake of convenience, as mentioned above, in the present application, the imaging light is reflected by the reflection module 10 and then emitted and propagates to the optical lens 22. The emission direction of the reflection module 10 is consistent with the optical axis direction of the optical lens 22, both of which are the Z-axis direction. The incident direction of the imaging light entering the reflection module 10 is the Y-axis direction (the second axis 123Y direction), and the direction perpendicular to both the incident and emitting directions of the imaging light is the X-axis direction (the first axis 122X direction).

Figure 2:
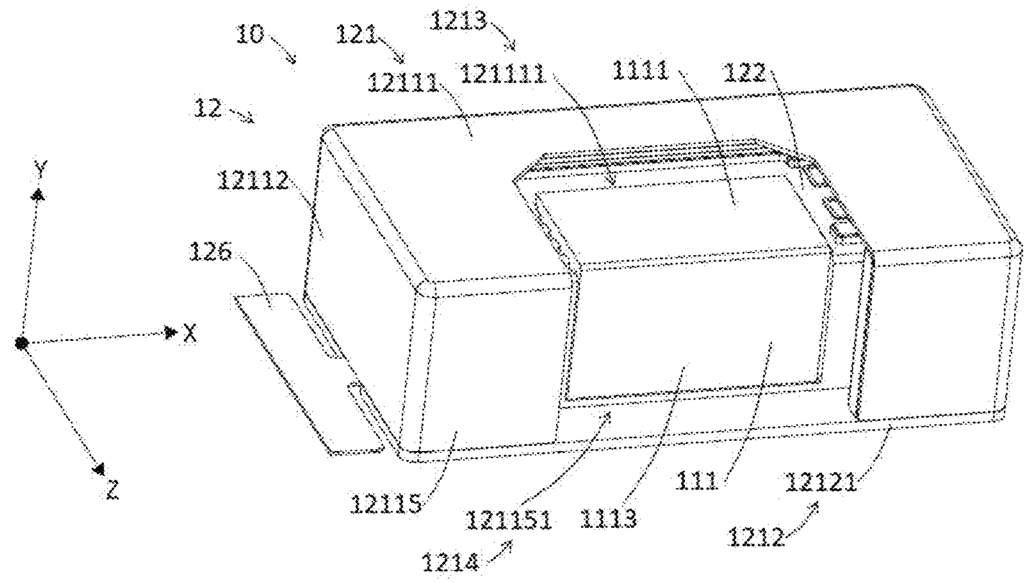
FIG. 2 shows a schematic perspective view of a reflection module according to an embodiment of the present application.
Figure 3A:
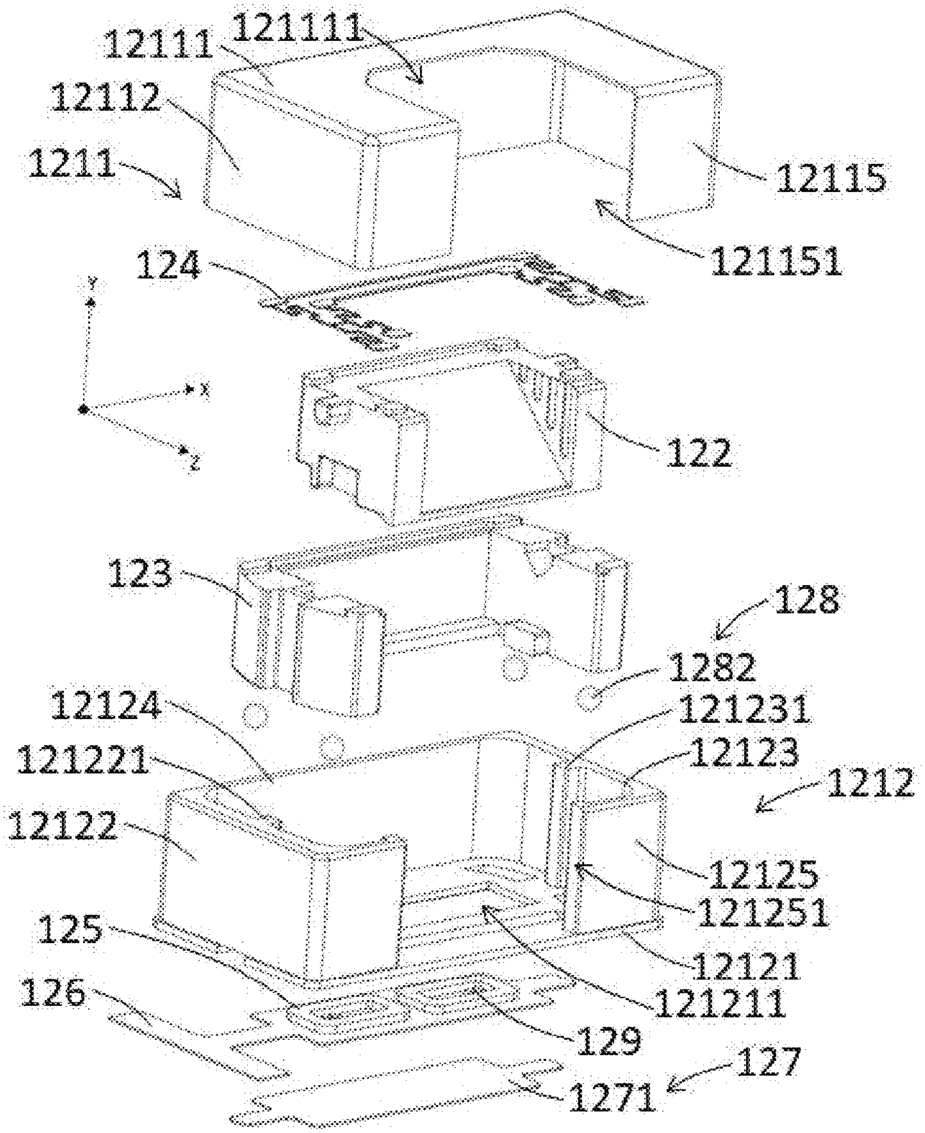
FIG. 3A shows a perspective exploded schematic top view of a reflection driving mechanism according to an embodiment of the present application.
Figure 3B:
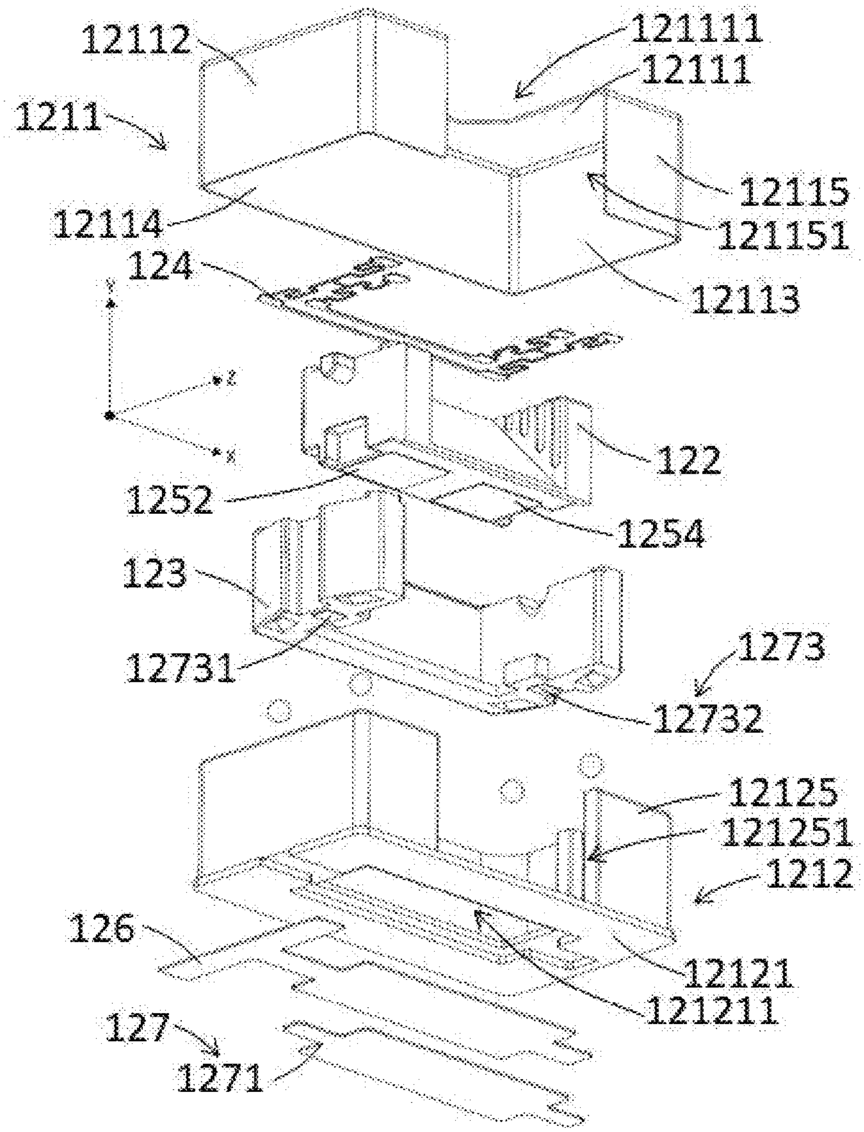
FIG. 3B shows an exploded perspective bottom view of the reflection driving mechanism according to an embodiment of the present application.

Referring to FIGS. 2 to 3B, in the embodiment of the present application, the reflection drive housing 121 has a receiving cavity and a light inlet 1213 and a light outlet 1214 connected to the receiving cavity. The imaging light from the object to be photographed enters the reflection drive housing 121 from the light inlet 1213, is reflected on the reflective element 11, and leaves the reflection drive housing 121 from the light outlet 1214.

In a specific example of the present application, as shown in FIGS. 2 to 3B, the reflection drive housing 121 comprises an upper cover 1211 and a base 1212. The upper cover 1211 is fixed to the base 1212 and forms an installation space of the reflection drive housing 121 to install other elements of the reflection driving mechanism 12.

Correspondingly, in this specific example, the upper cover 1211 comprises an upper cover body 12111 and a first upper cover side wall 12112, a second upper cover side wall 12113, a third upper cover side wall 12114 and a fourth upper cover side wall 12115 extending integrally on the periphery of the upper cover body 12111. The upper cover body 12111, the first upper cover side wall 12112, the second upper cover side wall 12113, the third upper cover side wall 12114 and the fourth upper cover side wall 12115 form an accommodating cavity of the upper cover 1211 to accommodate the base 1212. In the direction of the first axis 122X (X-axis), the first upper cover side wall 12112 and the second upper cover side wall 12113 are relatively arranged on both sides of the upper cover body 12111, the third upper cover side wall 12114 connects the first upper cover side wall 12112 and the second upper cover side wall 12113 and is arranged on a side of the upper cover body 12111, and the fourth upper cover side wall 12115 connects the first upper cover side wall 12112 and the second upper cover side wall 12113 and is arranged on the other side of the upper cover body 12111 opposite to the third upper cover side wall 12114. The fourth upper cover side wall 12115 is located at a side of the reflection module 10 from which the imaging light is emitted, that is, the fourth upper cover side wall 12115 is located at a side of the upper cover 1211 close to the lens module 20.

The upper cover 1211 comprises an upper cover light inlet 121111 formed on the upper cover body 12111 and an upper cover light outlet 121151 formed on the fourth upper cover side wall 12115. The upper cover light inlet 121111 provides a channel for the imaging light to be incident, and the upper cover light outlet 121151 provides a channel for the imaging light to be emitted. In one embodiment of the present application, the upper cover light inlet 121111 and the upper cover light outlet 121151 are connected to provide space for the reflective element 11 to move, thereby reducing the avoidance space provided by the reflection drive housing 121 to the reflective element 11 and reducing the size of the reflection driving mechanism 12. In another embodiment of the present application, the upper cover light inlet 121111 and the upper cover light outlet 121151 are not connected, thereby reducing stray light entering the lens module 20.

The base 1212 comprises a substrate 12121 and a first base side wall 12122, a second base side wall 12123, a third base side wall 12124 and a fourth base side wall 12125 surrounding the substrate 12121 and fixed to the substrate 12121. In this way, the base 1212 has an upward opening and forms an installation space together with the upper cover 1211. In the direction of the first axis 122X (X-axis), the first base side wall 12122 and the second base side wall 12123 are relatively arranged on both sides of the substrate 12121, the third base side wall 12124 connects the first base side wall 12122 and the second base side wall 12123 and is arranged on a side of the substrate 12121, and the fourth base side wall 12125 connects the first base side wall 12122 and the second base side wall 12123 and is arranged on the other side of the substrate 12121 opposite to the third base side wall 12124. The fourth base side wall 12125 is located on the side of the reflection module 10 from which the imaging light is emitted, that is, the fourth base side wall 12125 is located on the side of the base 1212 close to the lens module 20.

The base 1212 comprises a base light outlet 121251 formed in the fourth base side wall 12125, and the base light outlet 121251 provides a channel for the imaging light to exit. The base 1212 is formed by the substrate 12121 and the first base side wall 12122, the second base side wall 12123, the third base side wall 12124 and the fourth base side wall 12125. The upward opening and the upper cover light inlet 121111 of the upper cover 1211 together constitute the light inlet 1213 of the reflection drive housing 121. The base light outlet 121251 of the base 1212 and the upper cover light outlet 121151 of the upper cover 1211 together constitute the light outlet 1214 of the reflection drive housing 121.

As shown in FIGS. 2 to 6B, the reflective element 11 is installed in the reflection driving mechanism 12 by being fixed to the bearing seat 122, the bearing seat 122 is installed in the support frame 123 and is directly or indirectly supported by the support frame 123, and the support frame 123 is installed in the reflection drive housing 121 and is directly or indirectly supported by the reflection drive housing 121. More specifically, in the embodiment of the present application, the bearing seat 122 is rotatably mounted on the support frame 123, and the support frame 123 is also rotatably mounted in the reflection drive housing 121. In this way, after the reflective element 11 is installed on the bearing seat 122, when the bearing seat 122 and/or the support frame 123 rotate relative to the reflection drive housing 121, the reflective element 11 is also driven to rotate relative to the reflection drive housing 121 to achieve optical image stabilization of the camera module 1.

Figure 4A:
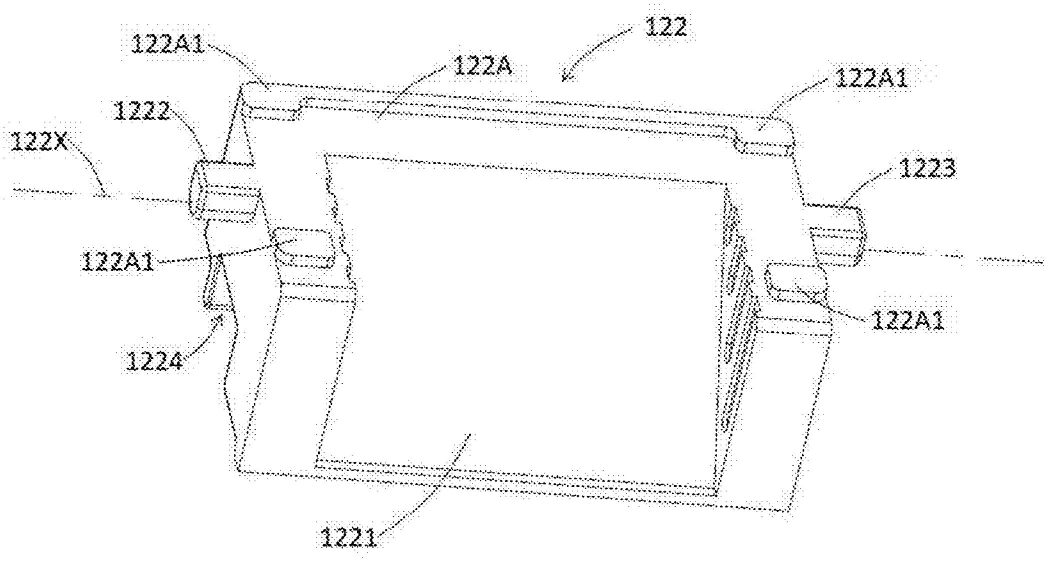
FIG. 4A shows a perspective schematic top view of a bearing seat according to an embodiment of the present application.
Figure 4B:
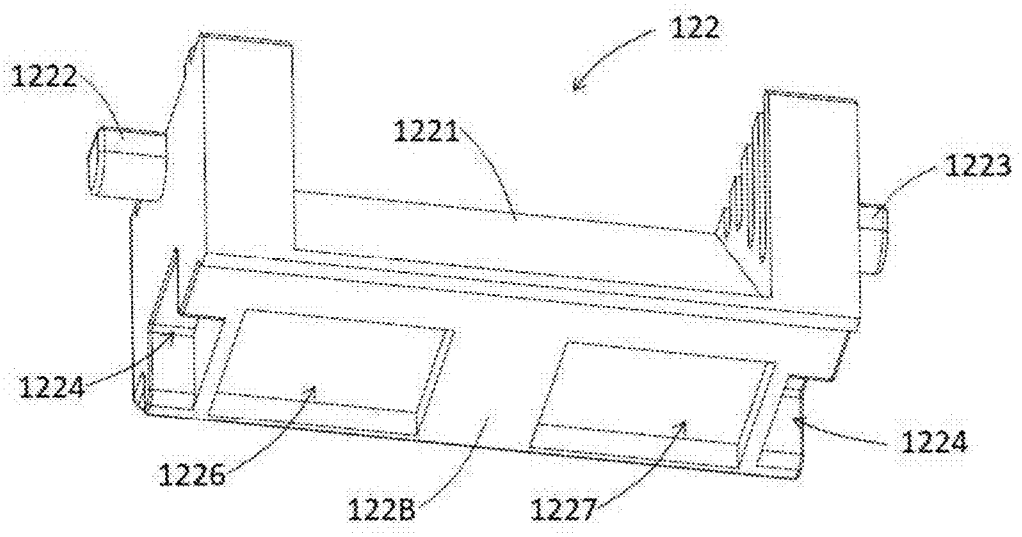
FIG. 4B shows a stereoscopic schematic bottom view of the bearing seat according to an embodiment of the present application.

In an embodiment of the present application, referring to FIGS. 4A to 4B, the bearing seat 122 comprises a bearing body 1221 having a mounting portion, wherein the mounting portion is recessedly formed on a side of the bearing seat 122 close to the side where the reflection module 10 emits the imaging light. The reflective element 11 is fixed to the bearing seat 122 by being mounted on the mounting portion. In the embodiment of the present application, the bearing seat 122 is suitable for being driven by the driving unit 125 to realize rotation around the first axis 122X (X-axis) and/or the second axis 123Y (Y-axis), thereby driving the reflective element 11 to rotate around the first axis 122X (X-axis) and/or the second axis 123Y (Y-axis).

Figure 5A:
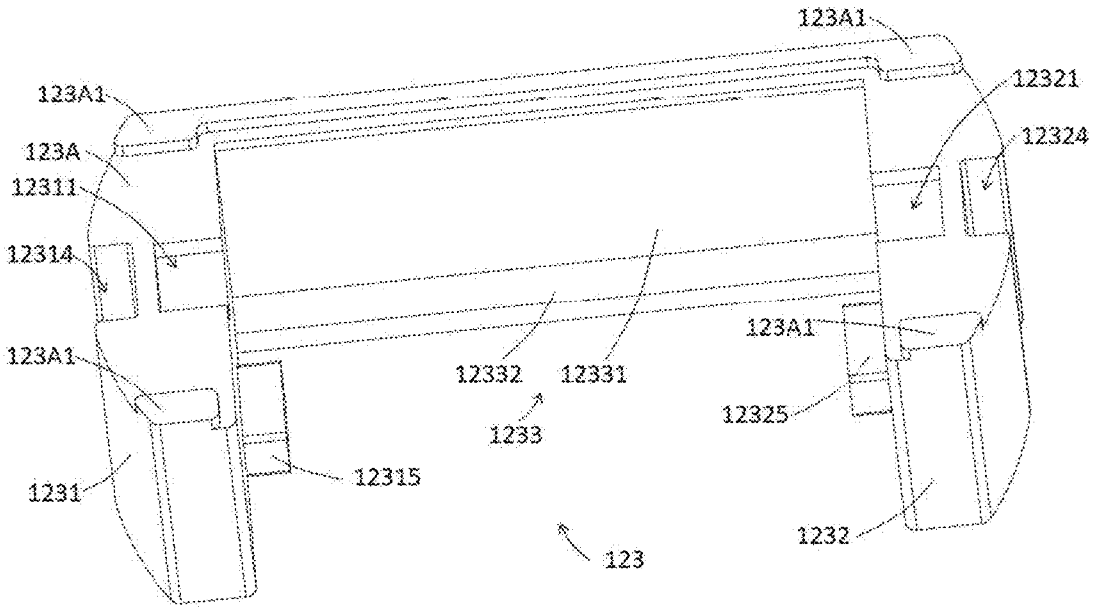
FIG. 5A shows a perspective schematic top view of a support frame according to an embodiment of the present application.
Figure 5B:
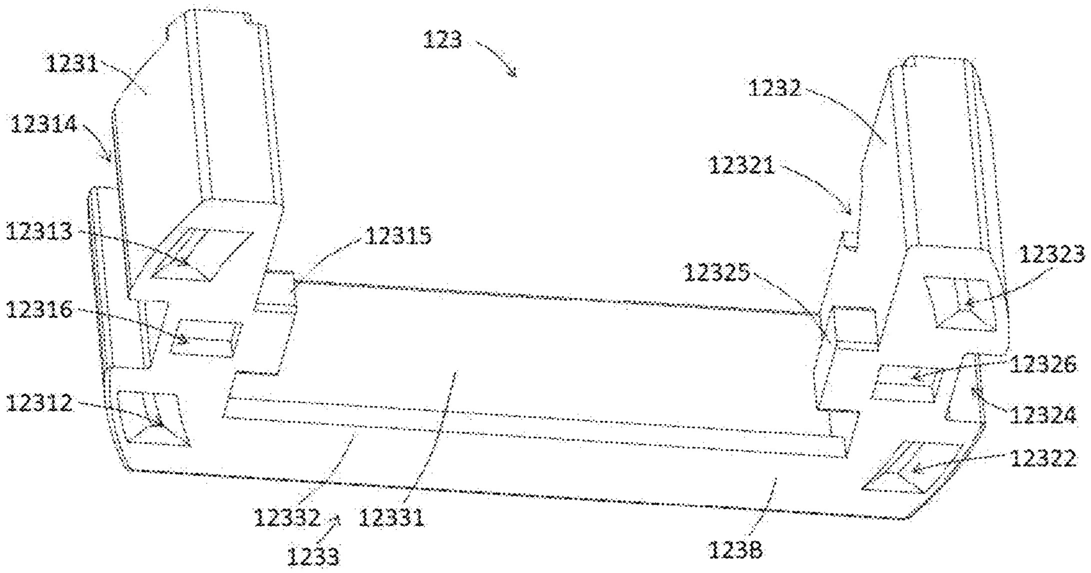
FIG. 5B shows a bottom perspective schematic view of the support frame according to an embodiment of the present application.
Figure 6A:
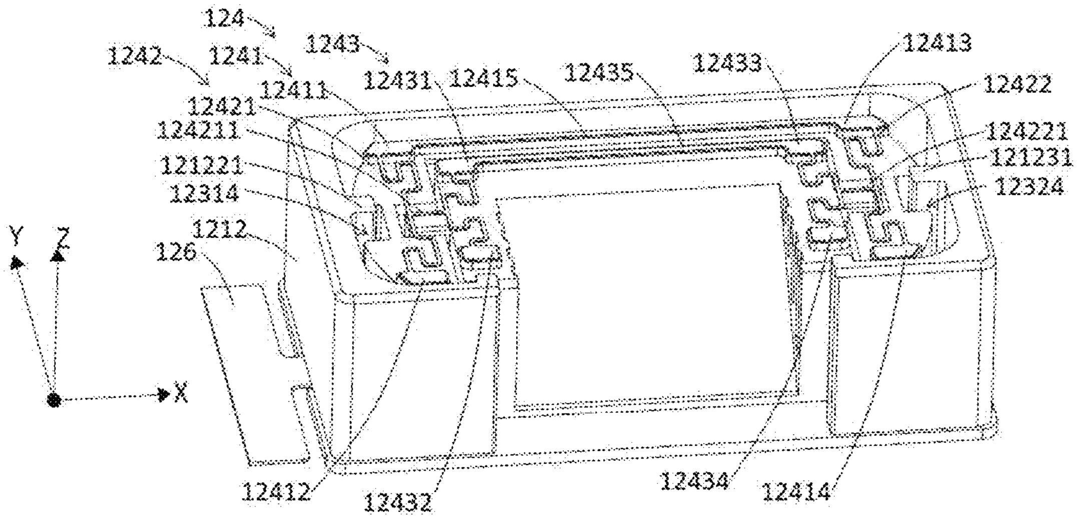
FIG. 6A is a perspective schematic view of the reflection driving mechanism according to an embodiment of the present application with the upper cover removed.
Figure 6B:
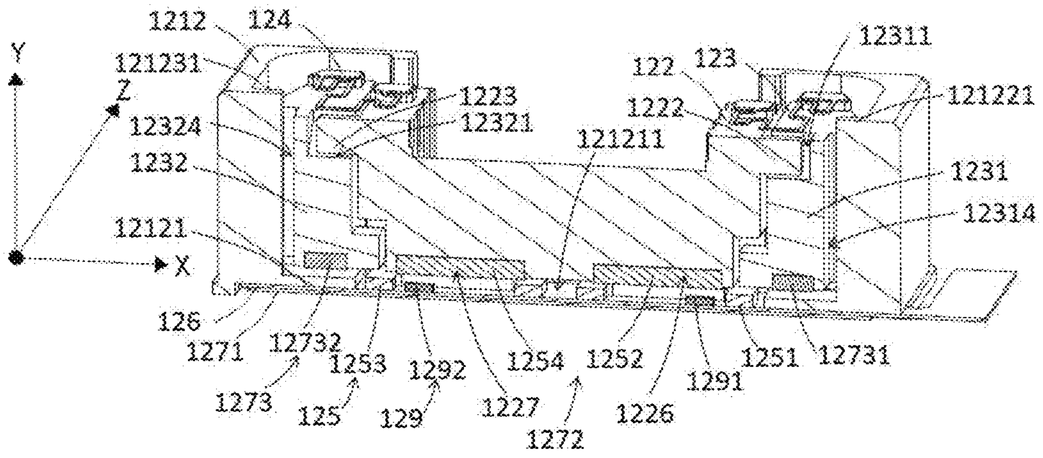
FIG. 6B shows a cross-sectional schematic view of the reflection driving mechanism according to the embodiment of the present application with the upper cover removed.

Referring to FIGS. 5A to 5B, the support frame 123 comprises a first support portion 1231, a second support portion 1232, and a frame connecting portion 1233 connecting the first support portion 1231 and the second support portion 1232. The first support portion 1231, the frame connecting portion 1233, and the second support portion 1232 are integrally formed by injection molding to form a U-shaped opening, and the U-shaped opening faces a side of the bearing seat 122. The bearing seat 122 is disposed in the U-shaped opening of the support frame 123 and is surrounded by the support frame 123. The bearing seat 122 is suitable for rotating around the first axis 122X (X-axis) relative to the support frame 123. In an embodiment of the present application, the frame connecting portion 1233 comprises a connected connection part body 12331 and a reinforcement member 12332, and the two ends of the connection part body 12331 and the reinforcement member 12332 are respectively connected to the first support portion 1231 and the second support portion 1232, and the reinforcement member 12332 enhances the structural strength of the support frame 123 to prevent the first support portion 1231 and the second support portion 1232 from bending inwardly. Referring to FIGS. 6A to 6B, the bearing seat 122 is rotatably mounted on the support frame 123. Specifically, the bearing seat 122 also comprises a first rotation axis 1222 and a second rotation axis 1223 which protrude from both sides of the bearing body 1221 toward the first support portion 1231 and the second support portion 1232, respectively, and the first axis 122X passes through the rotation axis center of the first rotation axis 1222 and the second rotation axis 1223, and the bearing seat 122 rotates around the rotation axis formed by the first rotation axis 1222 and the second rotation axis 1223. The top surface of the support frame 123 is recessed downward to form a first support groove 12311 and a second support groove 12321. The first support groove 12311 and the second support groove 12321 are symmetrically formed on the inner side of the first support portion 1231 and the inner side of the second support portion 1232, respectively. The first rotation axis 1222 is supported on the first support groove 12311, and the second rotation axis 1223 is supported on the second support groove 12321, so that the bearing seat 122 is supported on the support frame 123. At least a portion of the top surface of the support frame 123 is recessed downward to form the first support groove 12311 and the second support groove 12321, so that the assembly of the reflection driving mechanism 12 becomes simple, and it is only necessary to stack the components along the height direction (i.e., the Y-axis direction).

In an embodiment of the present application, the bottom surfaces of the first rotation axis 1222 and the second rotation axis 1223 contacting the support frame 123 have a curved surface shape, which may be a part of a cylindrical surface, a part of a spherical surface, or other types of curved surface shapes. The bottom surface of the first rotation axis 1222 contacts at least two surfaces of the first support groove 12311, and the bottom surface of the second rotation axis 1223 contacts at least two surfaces of the second support groove 12321, so that the first rotation axis 1222 is supported by the first support groove 12311 and rotates in the first support groove 12311, and the second rotation axis 1223 is supported by the second support groove 12321 and rotates in the second support groove 12321. The first support groove 12311 and the second support groove 12321 may be in a V-shaped groove, a rectangular groove, a trapezoidal groove, etc., but the present application is not limited thereto.

The bearing seat 122 rotates around the first axis 122X by relying on the rotation of the first rotation axis 1222 in the first support groove 12311 and the rotation of the second rotation axis 1223 in the second support groove 12321. In order to enable the bearing seat 122 to rotate, the rotation axis of the first rotation axis 1222 and the rotation axis of the second rotation axis 1223 are coaxially arranged, and the axes of the two are at the same height. Furthermore, in order to enable the rotation of the bearing seat 122 to drive the reflective element 11 to have a larger rotation angle when rotating around the first axis 122X, the first rotation axis 1222 and the second rotation axis 1223 are located at the top of the bearing seat 122.

That is to say, in the embodiment of the present application, the bearing seat 122 is rotatably connected to the support frame 123 via a pivot connection structure so that the bearing seat 122 can rotate relative to the support frame 123. Here, the pivot connection structure refers to a structure in which a first object provided with the axis can rotate relative to a second object provided with the groove through cooperation between the axis and the groove. It is particularly worth mentioning that, on the one hand, the pivot connection structure allows the bearing seat 122 to rotate relative to the support frame 123, and on the other hand, when the bearing seat 122 and the support frame 123 are rotated as a whole, the relative position relationship between the bearing seat 122 and the support frame 123 as sub-parts will not change easily.

It should be understood that although the bearing seat 122 is taken as an example to comprise the first rotation axis 1222 and the second rotation axis 1223, it should be understood that in the embodiment of the present application, the bearing seat 122 may only comprise at least one rotation axis, and accordingly, the support frame 123 may also be configured with only one support groove, so that the bearing seat 122 can rotate relative to the support frame 123 through the pivot connection between the at least one rotation axis and the at least one support groove.

In order to limit the rotation angle of the bearing seat 122 relative to the support frame 123, the reflection driving mechanism 12 further comprises a first rotation limiting portion disposed between the bearing seat 122 and the support frame 123. Specifically, in some embodiments of the present application, at least a portion of the first support portion 1231 protrudes toward the direction of the bearing seat 122 to form a first limiting protrusion 12315, and at least a portion of the side of the bearing seat 122 opposite to the first support portion 1231 is recessed to form a first limiting groove 1224, and the first limiting protrusion 12315 cooperates with the first limiting groove 1224 to limit the rotation angle of the bearing seat 122 relative to the support frame 123 around the first axis 122X (X-axis). At the same time, at least a portion of the second support portion 1232 protrudes toward the direction of the bearing seat 122 to form a second limiting protrusion 12325, and at least a portion of the side of the bearing seat 122 opposite to the second support portion 1232 is recessed to form a second limiting groove 1225, and the second limiting protrusion 12325 cooperates with the second limiting groove 1225 to limit the rotation angle of the bearing seat 122 relative to the support frame 123 around the first axis 122X (X-axis).

In an embodiment of the present application, the first limiting protrusion 12315 is located at the bottom of the first support portion 1231, and the second limiting protrusion 12325 is located at the bottom of the second support portion 1232, and the first limiting protrusion 12315 and the second limiting protrusion 12325 are symmetrically arranged on the inner side of the support frame 123, so that the first rotation limiting portion is relatively far away from the first axis 122X, so that the rotation angle of the bearing seat 122 relative to the support frame 123 around the first axis 122X (X-axis) is larger. In some embodiments of the present application, a maximum rotation angle of the bearing seat 122 relative to the support frame 123 around the first axis 122X (X-axis) is 2°.

Furthermore, in an embodiment of the present application, the support frame 123 is rotatably installed in the reflection drive housing 121. In an embodiment of the present application, the support frame 123 is rotatably installed in the reflection drive housing 121 through a rotation support assembly 128, so that the support frame 123 can rotate relative to the reflection drive housing 121. That is to say, in some embodiments of the present application, the rotation support assembly 128 is arranged between the support frame 123 and the reflection drive housing 121, so that the support frame 123 is supported on the reflection drive housing 121 through the rotation support assembly 128 and rotates relative to the driving shell around the second axis 123Y (Y-axis) by means of the rotation support assembly 128.

In an embodiment of the present application, the rotation support assembly 128 comprises a rotation track 1281 and at least three balls 1282 disposed in the rotation track 1281, and at least three balls 1282 abut against the rotation track 1281. The rotation track 1281 comprises an upper track groove formed on the bottom surface of the frame of the support frame 123 and a lower track groove formed on the reflection drive housing 121, and the upper track groove and the lower track groove hold at least three balls 1282 therein, and at least three balls 1282 are in contact with the upper track groove and the lower track groove. In the present application, the number of the balls 1282 may be three, four, five or more. When the number of the balls 1282 is greater than or equal to three, at least three of the balls 1282 provide a supporting plane for supporting the support frame 123. When the number of the balls 1282 is equal to three, preferably, the interval between the three balls 1282 is 120°%.

In a specific embodiment of the present application, referring to FIGS. 3A, 3B, 6B and 7, the rotation support assembly 128 comprises four ball bearings 1282, the upper track groove of the rotation track 1281 comprises a first upper track groove 12312, a second upper track groove 12313 recessedly formed on the bottom surface of the first support portion 1231 and a third upper track groove 12322, a fourth upper track groove 12323 recessedly formed on the bottom surface of the second support portion 1232, and the lower track groove of the rotation track 1281 comprises a first lower track groove 121212, a second lower track groove 121213, a third lower track groove 121214 and a fourth lower track groove 121215 recessedly formed on the upper surface of the substrate 12121 of the base 1212. The first upper track groove 12312 corresponds to the first lower track groove 121212 and holds the ball 1282 therein, the second upper track groove 12313 corresponds to the second lower track groove 121213 and holds the ball 1282 therein, the third upper track groove 12322 corresponds to the third lower track groove 121214 and holds the ball 1282 therein, and the fourth upper track groove 12323 corresponds to the fourth lower track groove 121215 and holds the ball 1282 therein.

Figure 7:
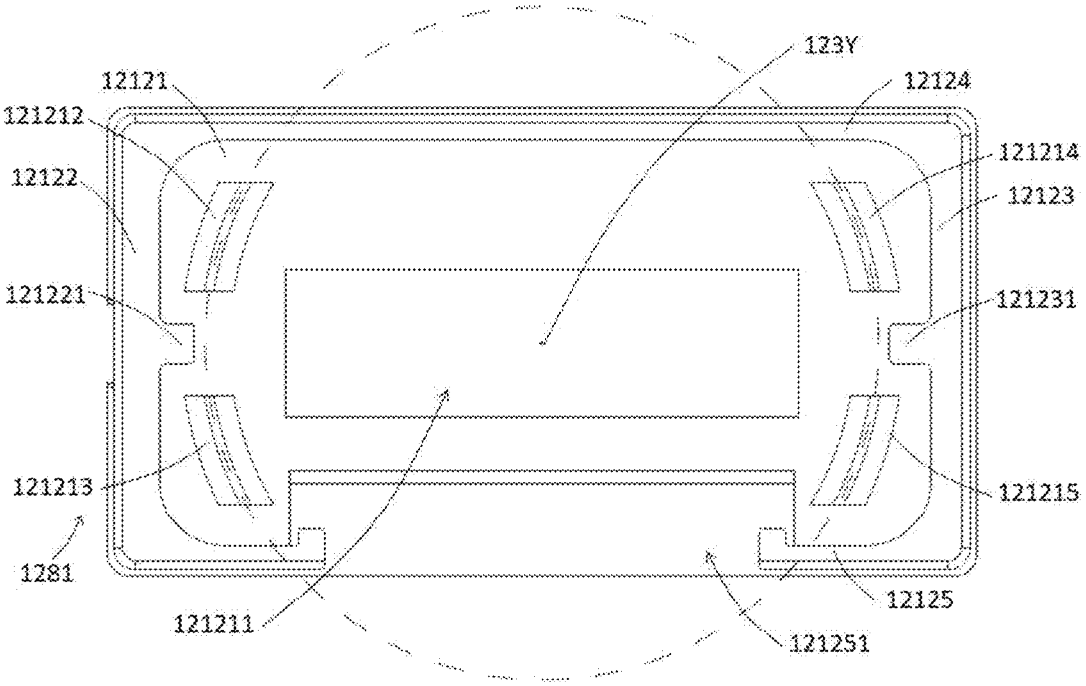
FIG. 7 shows a schematic top view of a base according to an embodiment of the present application.

As shown in FIG. 7, the first lower track groove 121212, the second lower track groove 121213, the third lower track groove 121214 and the fourth lower track groove 121215 are arc-shaped track grooves and are distributed on a circular trajectory. The second axis 123Y (Y-axis) passes through the center of the circular trajectory. Correspondingly, the first upper track groove 12312, the second upper track groove 12313, the third upper track groove 12322 and the fourth upper track groove 12323 are also arc-shaped track grooves and are distributed on a circular trajectory of the same size.

In order to limit the rotation angle between the reflection drive housing 121 and the support frame 123, in some embodiments of the present application, the reflection driving mechanism 12 further comprises a second rotation limiting portion disposed between the support frame 123 and the base 1212. Specifically, referring to FIGS. 5A to 7, at least a portion of the outer side surface of the first support portion 1231 close to the base 1212 is recessed to form a third limiting groove 12314, and at least a portion of the side of the base 1212 opposite to the first support portion 1231 is protruded to form a third limiting protrusion 121221. The third limiting groove 12314 and the third limiting protrusion 121221 cooperate to limit the rotation angle of the support frame 123 around the second axis 123Y (Y-axis). At the same time, at least a portion of the outer side surface of the second support portion 1232 close to the base 1212 is recessed to form a fourth limiting groove 12324, and at least a portion of the side of the base 1212 opposite to the second support portion 1232 is protruded to form a fourth limiting protrusion 121231. The fourth limiting groove 12324 and the fourth limiting protrusion 121231 cooperate to limit the rotation angle of the support frame 123 around the second axis 123Y (Y-axis). In other words, the third limiting groove 12314 is formed on the outer side of the first support portion 1231, the fourth limiting groove 12324 is formed on the outer side of the second support portion 1232, the third limiting protrusion 121221 is formed on the inner side of the first base side wall 12122, and the fourth limiting protrusion 121231 is formed on the inner side of the second base side wall 12123, so that the second rotation limiting portion is relatively far away from the second axis 123Y, so that the rotation angle of the support frame 123 relative to the base 1212 around the second axis 123Y (Y-axis) is larger. In an embodiment of the present application, the maximum rotation angle of the support frame 123 relative to the base 1212 around the second axis 123Y (Y-axis) is 4°.

In the present application, the driving unit 125 is disposed between the bearing seat 122 and the base 1212, so as to drive the bearing seat 122 to move, and realize the bearing seat 122 to rotate relative to the support frame 123 around the first axis 122X (X-axis) through the first rotation axis 1222, the second rotation axis 1223, the first support groove 12311 and the second support groove 12321. The support frame 123 is then driven to move by the contact between the bearing seat 122 and the support frame 123, and the support frame 123 is rotated relative to the base 1212 around the second axis 123Y (Y-axis) by the rotation support assembly 128.

It should be noted that in the embodiment of the present application, a pivot connection structure is provided between the bearing seat 122 and the support frame 123 so that the bearing seat 122 can rotate relative to the support frame 123, and a rotation support assembly 128 is provided between the support frame 123 and the reflection drive housing 121 so that the support frame 123 can rotate relative to the reflection drive housing 121. Here, it should be particularly emphasized that it is preferred in the present application to realize rotatable connection through two different rotating support mechanisms. Although the bearing seat 122 and the support frame 123 can also be rotatably installed through a rotation support assembly 128, or the support frame 123 and the reflection drive housing 121 can also be rotatably installed through a pivot connection structure, it is preferred to realize the rotatable installation between the bearing seat 122 and the support frame 123 with a pivot connection structure and realize the rotatable installation between the support frame 123 and the reflection drive housing 121 through a rotation support assembly 128. The reason is: on the one hand, when the bearing seat 122 and the support frame 123 are pivoted around the second axis 123Y as a whole, the pivot connection relationship between the bearing seat 122 and the support frame 123 can ensure that relative movement between the two will not occur easily, that is, the stabilization control of the camera module 1 is more accurate in the direction around the second axis 123Y. On the other hand, the driving unit 125 is arranged between the bearing seat 122 and the base 1212, that is, the driving unit 125 is far away from the pivot connection structure, so that only a relatively smaller force is required to drive the bearing seat 122 to rotate relative to the support frame 123, that is, the stabilization of the camera module 1 in the direction around the first axis 122X is easier to drive and control.

In an embodiment of the present application, the driving unit 125 is implemented as at least two coil-magnet pairs, and the at least two coil-magnet pairs comprise at least two coils arranged in one of the bearing seat 122 and the base 1212 and at least two magnets arranged in the other of the bearing seat 122 and the base 1212, and the at least two coils correspond to the at least two magnets. In a specific embodiment of the present application, referring to FIG. 3A, FIG. 3B and FIG. 6B the driving unit 125 comprises two coil-magnet pairs, and the driving unit 125 comprises a first driving magnet 1252 and a second driving magnet 1254 fixed to the bearing seat bottom surface 122B of the bearing seat 122, and a first driving coil 1251 and a second driving coil 1253 respectively corresponding to the first driving magnet 1252 and the second driving magnet 1254 and directly or indirectly fixed to the substrate 12121 of the base 1212. In some embodiments of the present application, the first driving magnet 1252 and the second driving magnet 1254 are symmetrically arranged on the bearing seat bottom surface 122B of the bearing seat.

Specifically, the reflection driving mechanism 12 comprises a reflection part circuit board 126 for providing current to the driving unit 125, the reflection part circuit board 126 is fixed to the base 1212, the first driving coil 1251 and the second driving coil 1253 are fixed and electrically connected to the reflection part circuit board 126, so that the reflection part circuit board 126 provides current to the first driving coil 1251 and the second driving coil 1253. The substrate 12121 of the base 1212 has a substrate through hole 121211, the reflection part circuit board 126 is fixed to the bottom surface of the substrate 12121, and then the reflection part circuit board 126 and the substrate through hole 121211 form a coil receiving cavity, and the first driving coil 1251 and the second driving coil 1253 are accommodated in the coil receiving cavity. The bearing seat bottom surface 122B of the bearing seat 122 is recessed inward to form a first bearing seat magnet groove 1226 and a second bearing seat magnet groove 1227. The first driving magnet 1252 is fixed in the first bearing seat magnet groove 1226, and the second driving magnet 1254 is fixed in the second bearing seat magnet groove 1227, thereby reducing the increase in the size of the reflection driving mechanism 12 caused by the volume of the magnet.

The first driving coil 1251 and the first driving magnet 1252 are arranged opposite to each other to form a first coil-magnet pair, and the second driving coil 1253 and the second driving magnet 1254 are arranged opposite to each other to form a second coil-magnet pair. By changing the magnitude and direction of the current in the first driving coil 1251 and the second driving coil 1253, the magnitude and direction of the electromagnetic force between the first driving coil 1251 and the first driving magnet 1252 are changed, and the magnitude and direction of the electromagnetic force between the second driving coil 1253 and the second driving magnet 1254 are changed, thereby changing the direction of the resultant force of the first coil-magnet pair and the second coil-magnet pair, and then adjusting the rotation direction of the bearing seat 122.

Figure 8:
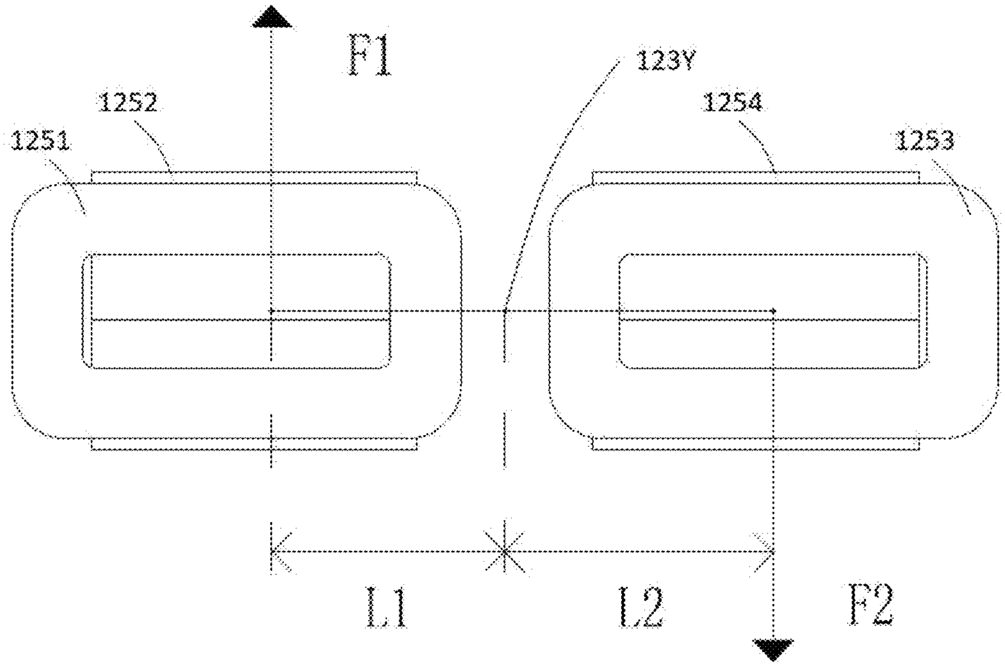
FIG. 8 shows a schematic view of driving force of two coil-magnet pairs according to an embodiment of the present application.

Specifically, as shown in FIG. 8, the first coil-magnet pair provides the bearing seat 122 with a first driving force F1, and the second coil-magnet pair provides the bearing seat 122 with a second driving force F2, and F1 and F2 represent the magnitude and direction of the first driving force and the second driving force, for example, when the first driving force is in opposite directions to the second driving force, one of F1 and F2 is a positive value and the other is a negative value; The vertical distance from the first driving force F1 to the rotation axis of the support frame 123 is the first force arm, and the first force arm is L1, and the vertical distance from the second driving force F2 to the rotation axis of the support frame 123 is the second force arm, and the second force arm is L2. In an embodiment of the present application, the direction of the first driving force F1 and the direction of the second driving force F2 are perpendicular to the plane where the first axis 122X (X-axis) and the second axis 123Y (Y-axis) are located, and the rotation axis of the support frame 123 is the second axis 123Y (Y-axis).

The rotation of the bearing seat 122 relative to the support frame 123 is determined by the resultant force Fo of the first driving force F1 and the second driving force F2, Fo=F1+F2, when Fo is equal to 0, the bearing seat 122 is stationary relative to the support frame 123; When Fo is not equal to 0, the bearing seat 122 rotates around the first axis 122X (X-axis) relative to the support frame 123, and the positive or negative value of Fo indicates the direction of rotation of the bearing seat 122.

The rotation of the support frame 123 relative to the base 1212 is determined by the difference Mo between the torque M1 of the first driving force F1 and the torque M2 of the second driving force F2, Mo=M1−M2=F1*L1−F2*L2. When Mo is equal to 0, the support frame 123 is stationary relative to the base 1212; When Mo is not equal to 0, the support frame 123 rotates relative to the base 1212 around the second axis 123Y (Y-axis). The positive or negative value of Mo indicates the direction of rotation of the support frame 123.

As can be seen from the above, when Fo and Mo are not 0, the bearing seat 122 rotates relative to the support frame 123, and the support frame 123 rotates relative to the base 1212, so that the bearing seat 122 rotates relative to the base 1212 in two directions, that is, the bearing seat 122 rotates relative to the base 1212 around the first axis 122X (X-axis) and the second axis 123Y (Y-axis).

In a specific embodiment of the present application, the distance between the first force arm L1 and the second force arm L2 is equal. When the first driving force F1 and the second driving force F2 are in the same direction and equal in magnitude, the bearing seat 122 rotates relative to the support frame 123 around the first axis 122X (X-axis), and the support frame 123 is stationary relative to the base 1212, so that the bearing seat 122 rotates relative to the base 1212, around the first axis 122X (X-axis); When the first driving force F1 and the second driving force F2 are in opposite directions and equal in magnitude, the bearing seat 122 is stationary relative to the support frame 123, and the support frame 123 rotates relative to the base 1212 around the second axis 123Y (Y-axis), so that the bearing seat 122 rotates relative to the base 1212 around the second axis 123Y (Y-axis). When the first driving force F1 and the second driving force F2 are not equal in magnitude, the bearing seat 122 rotates relative to the support frame 123 around the first axis 122X (X-axis), and the support frame 123 rotates relative to the base 1212 around the second axis 123Y (Y-axis), so that the bearing seat 122 rotates relative to the base 1212 around the first axis 122X (X-axis) and the second axis 123Y (Y-axis).

In an embodiment of the present application, the first driving magnet 1252 and the second driving magnet 1254 are suitable for being formed on the same magnet. That is, in some embodiments of the present application, the first driving magnet 1252 and the second driving magnet 1254 have an integrated structure, which is essentially one magnet. Accordingly, in this embodiment, the first bearing seat magnet groove 1226 and the second bearing seat magnet groove 1227 are connected to accommodate the connected first driving magnet 1252 and the second driving magnet 1254.

In an embodiment of the present application, the reflection driving mechanism 12 also comprises a position sensing unit 129. As shown in FIG. 3A and FIG. 6B, the position sensing unit 129 comprises a first position sensing element 1291 and a second position sensing element 1292 fixed and electrically connected to the reflection part circuit board 126. The first position sensing element 1291 and the second position sensing element 1292 obtain the position information of the magnet on the bearing seat 122 to determine the position information of the bearing seat 122. Specifically, the first position sensing element 1291 is arranged opposite to the first driving magnet 1252, and the second position sensing element 1292 is arranged opposite to the second driving magnet 1254. The first position sensing element 1291 is eccentrically arranged in the first driving coil 1251, and the second position sensing element 1292 is eccentrically arranged in the second driving coil 1253.

In order to ensure that the support frame 123 and the bearing seat 122 have a stable relative position relationship with respect to the reflection drive housing 121, that is, in order to ensure that the support frame 123 and the bearing seat 122 have a stable relative position relationship with respect to the base 1212, in the embodiment of the present application, the reflection driving mechanism 12 further comprises a reflection part magnetic attraction component 127.

Correspondingly, the reflection part magnetic attraction component 127 is arranged between the bottom surface of the bearing seat 122 and the substrate 12121 of the base 1212 and between the bottom surface of the support frame 123 and the substrate 12121 of the base 1212, so that the bearing seat 122 and the support frame 123 are attracted to the substrate 12121 by magnetic attraction force, thereby preventing the bearing seat 122 and the support frame 123 from falling due to the movement of the reflection driving mechanism 12. The reflection part magnetic attraction component 127 comprises a reflection part magnetic conductive sheet 1271, a frame magnetic attraction magnet 1273 and a bearing magnetic attraction magnet 1272, wherein the frame magnetic attraction magnet 1273 is fixed to the frame bottom surface 123B of the support frame 123, and the reflection part magnetic conductive sheet 1271 is directly or indirectly fixed to the substrate 12121, and the magnetic attraction force between the frame magnetic attraction magnet 1273 and the reflection part magnetic conductive sheet 1271 enables at least three balls 1282 to be held between the support frame 123 and the substrate 12121, and thus the support frame 123 can be supported on the substrate 12121 by at least three balls 1282. The bearing magnetic attraction magnet 1272 is fixed to the bearing seat bottom surface 122B of the bearing seat 122 and is opposite to the reflection part magnetic conductive sheet 1271, and the bearing seat 122 can be supported on the support frame 123 by the magnetic attraction force between the bearing magnetic attraction magnet 1272 and the reflection part magnetic conductive sheet 1271.

In an embodiment of the present application, the frame magnetic attraction magnet 1273 comprises a first frame magnetic attraction magnet 12731 and a second frame magnetic attraction magnet 12732, the bottom surface of the first support portion 1231 is recessed inward to form a first support frame magnetic 15: groove 12316, the bottom surface of the second support portion 1232 is recessed inward to form a second support frame magnetic groove 12326, the first frame magnetic attraction magnet 12731 is disposed in the first support frame magnetic groove 12316, and the second frame magnetic attraction magnet 12732 is disposed in the second support frame magnetic groove 12326, thereby reducing the size of the reflection driving mechanism 12.

In an embodiment of the present application, the bearing magnetic attraction magnet 1272 may be a first driving magnet 1252 and a second driving magnet 1254. In an embodiment of the present application, the reflection part magnetic conductive sheet 1271 is attached to the side of the reflection part circuit board 126 away from the frame magnetic attraction magnet 1273, so that the reflection part magnetic conductive sheet 1271 can provide structural reinforcement for the reflection part circuit board 126 while attracting the magnet. In an embodiment of the present application, the reflection part magnetic conductive sheet 1271 is made of a material that can attract the magnet, such as an iron sheet.

In order to further ensure a stable relative position relationship between the bearing seat 122 and the support frame 123, in the embodiment of the present application, the reflection driving mechanism 12 also comprises a spring sheet 124, that is, an element with an elastic sheet structure. As shown in FIG. 3A, FIG. 3B and FIG. 6A, the spring sheet 124 comprises an outer fixing portion 1241, an inner fixing portion 1243 and a spring wire portion 1242 connecting the outer fixing portion 1241 and the inner fixing portion 1243. The outer fixing portion 1241 is fixed to the frame top surface 123A of the support frame 123, and the inner fixing portion 1243 is fixed to the bearing seat top surface 122A of the bearing seat 122, so that the bearing seat 122 is retained in the support frame 123. In an embodiment of the present application, the bearing seat 122 is centrally arranged in the support frame 123 through the spring sheet 124.

Specifically, the outer fixing portion 1241 comprises a first outer fixing portion 12411, a second outer fixing portion 12412, a third outer fixing portion 12413 and a fourth outer fixing portion 12414, the inner fixing portion 1243 comprises a first inner fixing portion 12431, a second inner fixing portion 12432, a third inner fixing portion 12433 and a fourth inner fixing portion 12434, and the spring wire portion 1242 comprises a first spring wire 12421 and a second spring wire 12422. The first outer fixing portion 12411 and the second outer fixing portion 12412 are fixed to the top surface of the first support portion 1231, the first inner fixing portion 12431 and the second inner fixing portion 12432 are fixed to a side of the bearing seat top surface 122A of the bearing seat 122 close to the first support portion 1231, and the first spring wire 12421 connects the first outer fixing portion 12411, the second outer fixing portion 12412, the first inner fixing portion 12431, and the second inner fixing portion 12432 to form a first spring sheet part. The third outer fixing portion 12413 and the fourth outer fixing portion 12414 are fixed to the top surface of the second support portion 1232, the third inner fixing portion 12433 and the fourth inner fixing portion 12434 are fixed to a side of the bearing seat top surface 122A of the bearing seat 122 close to the second support portion 1232, and the second spring wire 12422 connects the third outer fixing portion 12413, the fourth outer fixing portion 12414, the third inner fixing portion 12433, and the fourth inner fixing portion 12434 to form a second spring sheet part. The first spring sheet part and the second spring sheet part are symmetrical about the second axis 123Y (Y-axis), so that the bearing seat 122 is centrally disposed in the support frame 123.

In an embodiment of the present application, the bearing seat 122 further comprises four first fixing protrusions 122A1 formed on the bearing seat top surface 122A of the bearing seat, and the first inner fixing portion 12431, the second inner fixing portion 12432, the third inner fixing portion 12433 and the fourth inner fixing portion 12434 are respectively fixed to the bearing seat top surface 122A of the bearing seat by being fixed to the first fixing protrusions 122A1. The support frame 123 also comprises four second fixing protrusions 123A1 formed on the frame top surface 123A, and the first outer fixing portion 12411, the second outer fixing portion 12412, the third outer fixing portion 12413 and the fourth outer fixing portion 12414 are respectively fixed to the frame top surface 123A by being fixed to the second fixing protrusions 123A1.

In an embodiment of the present application, the first spring wire 12421 has a first spring wire rotation axis 124211, and the first spring wire 12421 is symmetrical about the first spring wire rotation axis 124211. The second spring wire 12422 has a second spring wire rotation axis 124221, and the second spring wire 12422 is symmetrical about the second spring wire rotation axis 124221. The first spring wire rotation axis 124211 and the second spring wire rotation axis 124221 are in the same direction as the first axis 122X (X-axis). In this way, when the bearing seat 122 rotates around the first axis 122X (X-axis) relative to the support frame 123, the spring sheet 124 has a small resistance to rotation.

In an embodiment of the present application, an external connection portion 12415 is integrally extended between the first outer fixing portion 12411 and the third outer fixing portion 12413 close to the frame connecting portion 1233, and an internal connection portion 12435 is integrally extended between the first inner fixing portion 12431 and the third inner fixing portion 12433 close to the frame connecting portion 1233, so that the first spring sheet part and the second spring sheet part are connected, thereby facilitating the installation of the spring sheet 124.

In another specific embodiment of the present application, as shown in FIGS. 9 to 11B, the driving unit 125 comprises three coil-magnet pairs, and the driving unit 125 comprises a first driving magnet 1252, a second driving magnet 1254, and a third driving magnet 1256 fixed to the bearing seat bottom surface 122B of the bearing seat 122, and a first driving coil 1251, a second driving coil 1253, and a third driving coil 1255 corresponding to the first driving magnet 1252, the second driving magnet 1254, and the third driving magnet 1256, respectively, and directly or indirectly fixed on the substrate 12121 of the base 1212, the first driving magnet 1252 and the second driving magnet 1254 are symmetrically arranged on the bearing seat bottom surface 122B of the bearing seat, and the third driving magnet 1256 is arranged between the first driving magnet 1252 and the second driving magnet 1254.

Specifically, the reflection part circuit board 126 is fixed to the bottom surface of the substrate 12121, and the reflection part circuit board 126 and the substrate through hole 121211 form a coil receiving cavity, and the first driving coil 1251, the second driving coil 1253 and the third driving coil 1255 are accommodated in the coil receiving cavity. The bearing seat bottom surface 122B of the bearing seat 122 is recessed inward to form a first bearing seat magnet groove 1226, a second bearing seat magnet groove 1227 and a third bearing seat magnet groove 1228. The first driving magnet 1252 is fixed in the first bearing seat magnet groove 1226, the second driving magnet 1254 is fixed in the second bearing seat magnet groove 1227, and the third driving magnet 1256 is fixed in the third bearing seat magnet groove 1228, thereby reducing the increase in the size of the reflection driving mechanism 12 caused by the volume of the magnet.

The first driving coil 1251 and the first driving magnet 1252 are arranged opposite to each other to form a first coil-magnet pair, the second driving coil 1253 and the second driving magnet 1254 are arranged opposite to each other to form a second coil-magnet pair, and the third driving coil 1255 and the third driving magnet 1256 are arranged opposite to each other to form a third coil-magnet pair. By changing the magnitude and direction of the current in the first driving coil 1251, the second driving coil 1253 and the third driving coil 1255, the magnitude and direction of the electromagnetic force between the first driving coil 1251 and the first driving magnet 1252, the magnitude and direction of the electromagnetic force between the second driving coil 1253 and the second driving magnet 1254, and the magnitude and direction of the electromagnetic force between the third driving coil 1255 and the third driving magnet 1256, the rotation direction of the bearing seat 122 is adjusted.

Figure 10:
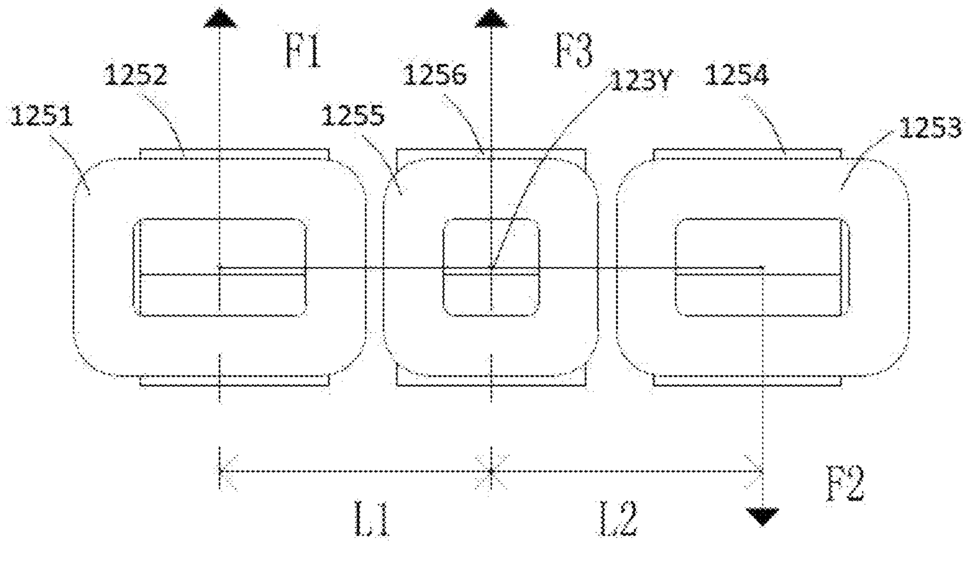
FIG. 10 is a schematic view illustrating driving forces of three coil-magnet pairs according to an embodiment of the present application.

Specifically, as shown in FIG. 10, the first coil-magnet pair provides the bearing seat 122 with a first driving force F1, the second coil-magnet pair provides the bearing seat 122 with a second driving force F2, and the third coil-magnet pair provides the bearing seat 122 with a third driving force F3. F1, F2, and F3 represent the magnitude and direction of the first driving force, the second driving force, and the third driving force. For example, when the first driving force is in opposite directions to the second driving force, one of F1 and F2 is a positive value, and the other is a negative value. The vertical distance from the first driving force F1 to the rotation axis of the support frame 123 is the first force arm, which is L1; the vertical distance from the second driving force F2 to the rotation axis of the support frame 123 is the second force arm, which is L2; the third coil-magnet pair is located in the middle, and the distance L3 from the third driving force F3 to the rotation axis of the support frame 123 is 0. In an embodiment of the present application, the directions of the first driving force F1, the second driving force F2 and the third driving force F3 are perpendicular to the plane where the first axis 122X (X-axis) and the second axis 123Y (Y-axis) are located, and the rotation axis of the support frame 123 is the second axis 123Y (Y-axis).

The rotation of the bearing seat 122 relative to the support frame 123 is determined by the resultant force Fz of the first driving force F1, the second driving force F2 and the third driving force F3, Fz=F1+F2+F3, when Fz is equal to 0, the bearing seat 122 is stationary relative to the support frame 123; When Fz is not equal to 0, the bearing seat 122 rotates around the first axis 122X (X-axis) relative to the support frame 123, and the positive or negative value of Fz indicates the direction of rotation of the bearing seat 122.

The rotation of the support frame 123 relative to the base 1212 is determined by the difference Mo between the torque M1 of the first driving force F1 and the torque M2 of the second driving force F2, Mo=M1−M2=F1*L1−F2*L2, when Mo is equal to 0, the support frame 123 is stationary relative to the base 1212. When Mo is not equal to 0, the support frame 123 rotates around the second axis 123Y (Y-axis) relative to the base 1212, and the positive or negative value of Mo indicates the direction in which the support frame 123 rotates.

From the above, it can be seen that when Fz and Mo are not 0, the bearing seat 122 rotates relative to the support frame 123, and the support frame 123 rotates relative to the base 1212, so that the bearing seat 122 rotates in two directions relative to the base 1212, that is, the bearing seat 122 rotates relative to the base 1212 around the first axis 122X (X-axis) and the second axis 123Y (Y-axis).

In a specific embodiment of the present application, the distances between the first force arm L1 and the second force arm L2 are equal, and the distance L3 from the third driving force F3 to the rotation axis of the support frame 123 is 0. The third driving force F3 provided by the third coil-magnet pair located in the middle is used to drive the bearing seat 122 to rotate around the first axis 122X (X-axis) relative to the base 1212, and the first coil-magnet pair and the second coil-magnet pair symmetrically arranged on both sides are suitable for driving the bearing seat 1212 to rotate around the first axis 122X (X-axis) and the second axis 123Y (Y-axis). That is to say, in a special embodiment of the present application, the third coil-magnet pair is suitable for driving the bearing seat 122 to rotate relative to the support frame 123 around the first axis 122X, and the first coil-magnet pair and the second coil-magnet pair are suitable for cooperating to drive the bearing seat 122 to rotate relative to the reflection drive housing 121 around the second axis 123Y perpendicular to the first axis 122X so as to drive the support frame 123 to rotate relative to the reflection drive housing 121 around the second axis 123Y through the pivot connection between the bearing seat 122 and the support frame 123.

More specifically, in this particular embodiment, the difference between the first torque generated by the first coil-magnet pair acting on the bearing seat 122 and the second torque generated by the second coil-magnet pair acting on the bearing seat 122 determines the movement of the bearing seat 122 and the support frame 123 as a whole relative to the reflection drive housing 121. When the first driving force F1 and the second driving force F2 are in opposite directions and equal in magnitude, the support frame 123 rotates relative to the base 1212 around the second axis 123Y (Y-axis), so that the bearing seat 122 rotates relative to the base 1212 around the second axis 123Y (Y-axis). When the first driving force F1 and the second driving force F2 are not equal in magnitude, the first driving force F1, the second driving force F2 and the third driving force F3 together drive the bearing seat 122 to rotate relative to the base 1212 around the first axis 122X (X-axis) and the second axis 123Y (Y-axis).

Figure 11A:
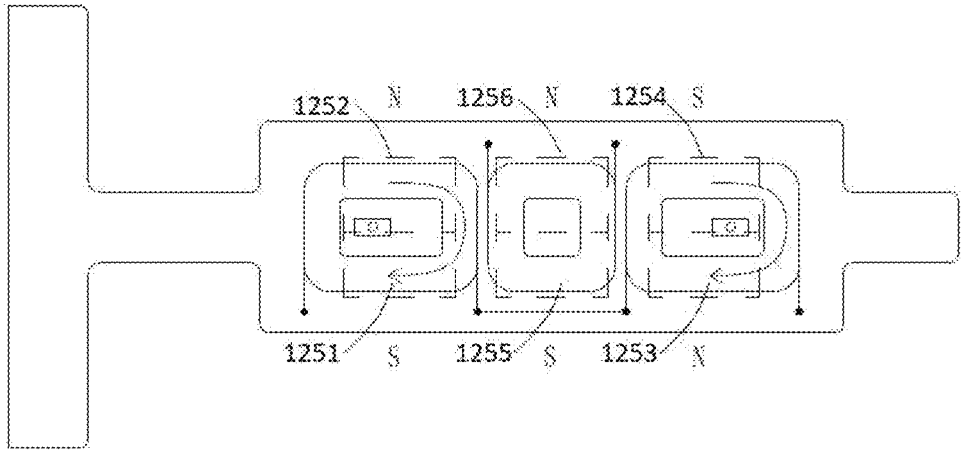
FIG. 11A is a schematic view illustrating three coil-magnet pairs according to an embodiment of the present application.
Figure 11B:
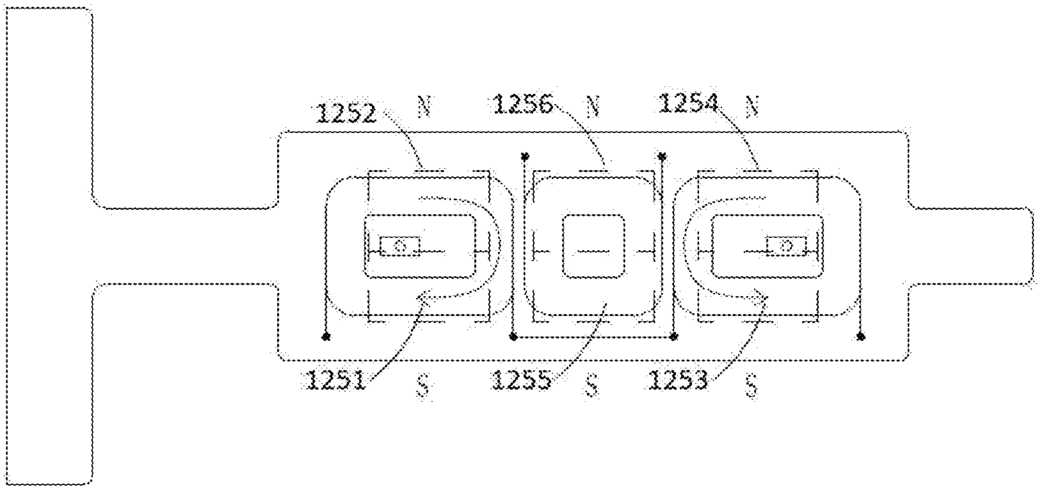
FIG. 11B shows another schematic view of three coil-magnet pairs according to an embodiment of the present application.

In an embodiment of the present application, the direction of the driving force provided by the first coil-magnet pair is always opposite to the direction of the driving force provided by the second coil-magnet pair, thereby reducing the loss of the driving force. For example, when the magnetic pole directions of the first driving magnet 1252 and the second driving magnet 1254 are the same, the current directions in the first driving coil 1251 and the second driving coil 1253 are opposite (the winding methods of the first driving coil 1251 and the second driving coil 1253 are set to be consistent), thereby providing driving forces in opposite directions, so as to always maintain the current directions in opposite directions, as shown in FIG. 11B. Of course, in other embodiments of the present application, when the magnetic pole directions of the first driving magnet 1252 and the second driving magnet 1254 are the same, the current directions in the first driving coil 1251 and the second driving coil 1253 are controlled to be the same (the winding methods of the first driving coil 1251 and the second driving coil 1253 are set to be consistent), thereby providing driving forces in opposite directions to always maintain the current directions in opposite directions. It should be understood that the winding methods of the first driving coil 1251 and the second driving coil 1253 can also be adjusted so that the directions of the forces generated by the first coil-magnet pair and the second coil-magnet pair acting on the bearing seat 122 are opposite.

In the embodiment of the present application, the reflection driving mechanism 12 also has an anti-fool mechanism. Specifically, the first driving coil 1251 and the second driving coil 1253 are connected in series and the winding directions of the first driving coil 1251 and the second driving coil 1253 are opposite, so that when the magnetic pole directions of the first driving magnet 1252 and the second driving magnet 1254 are opposite, the current directions in the first driving coil 1251 and the second driving coil 1253 are the same, thereby providing driving forces in opposite directions. That is, in this embodiment, the first driving coil 1251 and the second driving coil 1253 are connected in series, the winding direction of the first driving coil 1251 is opposite to the winding direction of the second driving coil 1253, and the magnetic poles of the first driving magnet 1252 and the second driving magnet 1254 are in the same direction. It should be understood that in other embodiments of the present application, the first driving coil 1251 and the second driving coil 1253 may be connected in series, the winding direction of the first driving coil 1251 is the same as the winding direction of the second driving coil 1253, and the magnetic poles of the first driving magnet 1252 and the second driving magnet 1254 are in opposite directions.

In an embodiment of the present application, the three coil-magnet pairs and the first coil-magnet pairs and the second coil-magnet pairs respectively drive the bearing seat 122 to rotate relative to the support frame 123 around the first axis 122X (X-axis) and drive the support frame 123 to rotate relative to the base 1212 around the second axis 123Y (Y-axis). Specifically, the first driving force F1 and the second driving force F2 have opposite directions and equal magnitudes, so that the resultant force of the first driving force F1 and the second driving force F2 is 0, and can only drive the support frame 123 to rotate around the second axis 123Y (Y-axis) relative to the base 1212, and then, the bearing seat 122 is controlled to rotate around the first axis 122X (X-axis) relative to the support frame 123 by the magnitude of the third driving force F3, and the rotation direction of the bearing seat 122 relative to the support frame 123 around the first axis 122X (X-axis) is controlled by the direction of the third driving force F3.

In an embodiment of the present application, the first driving magnet 1252, the second driving magnet 1254 and the third driving magnet 1256 are suitable for being formed on the same magnet. At this time, the first bearing seat magnet groove 1226, the second bearing seat magnet groove 1227 and the third bearing seat magnet groove 1228 are connected to accommodate the connected first driving magnet 1252, the second driving magnet 1254 and the third driving magnet 1256.

Figure 9:
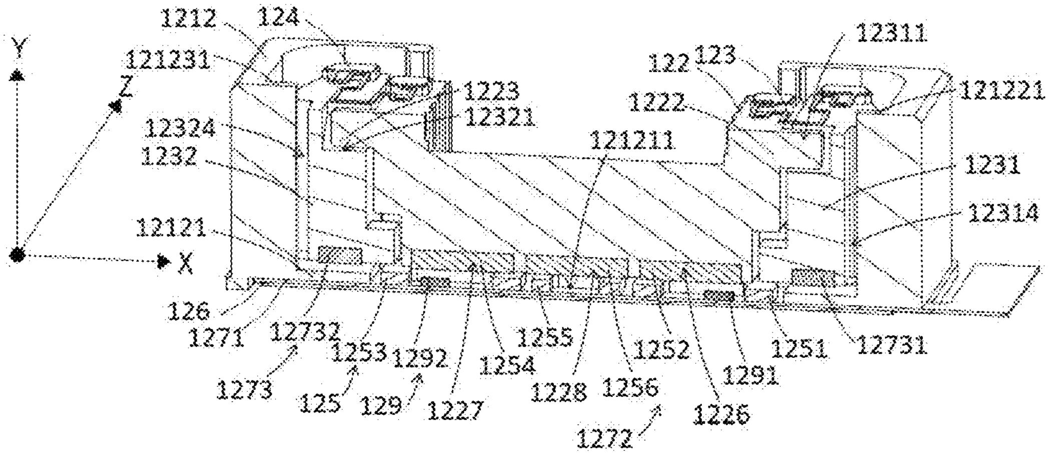
FIG. 9 shows a cross-sectional schematic view of another reflection driving mechanism according to an embodiment of the present application with the upper cover removed.

In an embodiment of the present application, the reflection driving mechanism 12 also comprises a position sensing unit 129. As shown in FIG. 9, the position sensing unit 129 comprises a first position sensing element 1291 and a second position sensing element 1292 fixed and electrically connected to the reflection part circuit board 126. The first position sensing element 1291 and the second position sensing element 1292 obtain the position information of the magnet on the bearing seat 122 to determine the position information of the bearing seat 122. Specifically, the first position sensing element 1291 is arranged opposite to the first driving magnet 1252, and the second position sensing element 1292 is arranged opposite to the second driving magnet 1254. The first position sensing element 1291 is eccentrically arranged in the first driving coil 1251, and the second position sensing element 1292 is eccentrically arranged in the second driving coil 1253.

In an embodiment of the present application, the reflection part magnetic attraction component 127 is disposed between the bottom surface of the bearing seat 122, the bottom surface of the support frame 123 and the substrate 12121 of the base 1212, so that the bearing seat 122 and the support frame 123 are attracted to the substrate 12121 by magnetic attraction force, preventing the bearing seat 122 and the support frame 123 from falling due to the movement of the reflection driving mechanism 12. The reflection part magnetic attraction component 127 comprises a reflection part magnetic conductive sheet 1271, a frame magnetic attraction magnet 1273 and a bearing magnetic attraction magnet 1272. The frame magnetic attraction magnet 1273 is fixed to the frame bottom surface 123B of the support frame 123. The reflection part magnetic conductive sheet 1271 is directly or indirectly fixed to the substrate 12121. The magnetic attraction force between the frame magnetic attraction magnet 1273 and the reflection part magnetic conductive sheet 1271 allows at least three balls 1282 to be held between the support frame 123 and the substrate 12121, and the support frame 123 can be supported on the substrate 12121 by at least three balls 1282. The bearing magnetic attraction magnet 1272 is fixed to the bearing seat bottom surface 122B of the bearing seat 122 and is opposite to the reflection part magnetic conductive sheet 1271, and the bearing seat 122 can be supported on the support frame 123 by the magnetic attraction force between the bearing magnetic attraction magnet 1272 and the reflection part magnetic conductive sheet 1271.

In an embodiment of the present application, the frame magnetic attraction magnet 1273 comprises a first frame magnetic attraction magnet 12731 and a second frame magnetic attraction magnet 12732, the bottom surface of the first support portion 1231 is recessed inward to form a first support frame magnetic groove 12316, the bottom surface of the second support portion 1232 is recessed inward to form a second support frame magnetic groove 12326, the first frame magnetic attraction magnet 12731 is disposed in the first support frame magnetic groove 12316, and the second frame magnetic attraction magnet 12732 is disposed in the second support frame magnetic groove 12326, thereby reducing the size of the reflection driving mechanism 12.

In an embodiment of the present application, the bearing magnetic attraction magnet 1272 may be a first driving magnet 1252, a second driving magnet 1254, and a third driving magnet 1256. In an embodiment of the present application, the reflection part magnetic conductive sheet 1271 is attached to the side of the reflection part circuit board 126 away from the frame magnetic attraction magnet 1273, so that the reflection part magnetic conductive sheet 1271 can provide structural reinforcement for the reflection part circuit board 126 while attracting the magnet. In an embodiment of the present application, the reflection part magnetic conductive sheet 1271 is a material that can attract the magnet, such as an iron sheet.

In summary, the camera module 1 and its reflection driving mechanism 12 according to the embodiment of the present application are explained, wherein the reflection driving mechanism 12 drives the reflective element 11 of the camera module 1 to rotate through a compact structural arrangement to achieve optical image stabilization of the camera module 1. Moreover, the reflective stabilization mechanism has a relatively small size, which is conducive to the miniaturization of the camera module 1.

Those skilled in the art should understand that the embodiments of the present invention described above and shown in the accompanying drawings are only examples and do not limit the present invention. The purpose of the present invention has been fully and effectively achieved. The functional and structural principles of the present invention have been demonstrated and explained in the embodiments, and the embodiments of the present invention may be deformed or modified without departing from the principles.

The invention claimed is:

1. A reflection driving mechanism, comprising:

a reflection drive housing having a receiving cavity formed therein and a light inlet and a light outlet communicated with the receiving cavity;

a rotation support assembly;

a support frame, which is rotatably mounted in the receiving cavity through the rotation support assembly, wherein the support frame has at least one support groove recessedly formed on its top surface;

a bearing seat rotatably mounted on the support frame, wherein the bearing seat comprises a bearing body and at least one rotation shaft protruding and extending laterally from the bearing body, the bearing body has a mounting portion suitable for mounting a reflective element thereon, and the at least one rotation shaft is fittedly mounted in the at least one support groove, so that the bearing seat can rotate relative to the support frame through the pivot connection between the at least one rotation shaft and the at least one support groove; and a driving unit, wherein the driving unit is suitable for driving the bearing seat to rotate relative to the support frame around a first axis set by the at least one rotation shaft, and the driving unit is suitable for driving the bearing seat to rotate relative to the reflection drive housing around a second axis perpendicular to the first axis so as to drive the support frame to rotate relative to the reflection drive housing around the second axis through the pivot connection between the bearing seat and the support frame;

wherein the reflection driving mechanism further comprises a spring sheet comprising an outer fixing portion fixed to the top surface of the support frame, an inner fixing portion fixed to the top surface of the bearing seat, and a spring wire portion extending between the inner fixing portion and the outer fixing portion;

wherein the bearing seat is centrally held in the support frame by the spring sheet;

wherein the outer fixing portion comprises a first outer fixing portion, a second outer fixing portion, a third outer fixing portion and a fourth outer fixing portion, the inner fixing portion comprises a first inner fixing portion, a second inner fixing portion, a third inner fixing portion and a fourth inner fixing portion, and the spring wire portion comprises a first spring wire and a second spring wire, wherein the first outer fixing portion and the second outer fixing portion are fixed to a side of the top surface of a first support portion of the support frame, the first inner fixing portion and the second inner fixing portion are fixed to a side of the top surface of the bearing seat, and the first spring wire connects the first outer fixing portion, the second outer fixing portion, the first inner fixing portion and the second inner fixing portion to form a first spring sheet part; the third outer fixing portion and the fourth outer fixing portion are fixed to the opposite side of the top surface of a second support portion of the support frame, the third inner fixing portion and the fourth inner fixing portion are fixed to the opposite side of the top surface of the bearing seat, and the second spring wire connects the third outer fixing portion, the fourth outer fixing portion, the third inner fixing portion and the fourth inner fixing portion to form a second spring sheet part, wherein the first spring sheet part and the second spring sheet part are arranged symmetrically with respect to the second axis.

2. The reflection driving mechanism according to claim 1, wherein the at least one rotation shaft comprises a first rotation shaft and a second rotation shaft extending outward from opposite sides of the bearing body, respectively, and the first rotation shaft and the second rotation shaft are coaxially arranged, and the at least one support groove comprises a first support groove and a second support groove recessedly formed on the top surface of the support frame, and the first support groove and the second support groove are coaxially arranged, wherein the first rotation shaft is fitted in the first support groove, and the second rotation shaft is fitted in the second support groove.

3. The reflection driving mechanism according to claim 2, wherein the support frame further comprises a frame connecting portion extending between the first support portion and the second support portion, and wherein the first support groove is recessedly formed on the top surface of the first support portion, and the second support groove is recessedly formed on the top surface of the second support portion.

4. The reflection driving mechanism according to claim 3, wherein the outer surface of the first rotation shaft contacts at least two surfaces of the first support groove, and the outer surface of the second rotation shaft contacts at least two surfaces of the second support groove.

5. The reflection driving mechanism according to claim 2, wherein the reflection driving mechanism further comprises a first rotation limiting portion for limiting the rotation angle of the bearing seat relative to the support frame.

6. The reflection driving mechanism according to claim 1, wherein the rotation support assembly comprises a rotation track formed between the support frame and the reflection drive housing and at least three balls arranged in the rotation track.

7. The reflection driving mechanism according to claim 1, wherein the driving unit comprises a first driving magnet and a second driving magnet disposed on the bottom surface of the bearing body, and a first driving coil and a second driving coil disposed in the reflection drive housing and corresponding to the first driving magnet and the second driving magnet, respectively, wherein the first driving magnet and the first driving coil constitute a first coil-magnet pair, and the second driving magnet and the second driving coil constitute a second coil-magnet pair.

8. The reflection driving mechanism according to claim 7, wherein the reflection drive housing comprises an upper cover and a base that are interlocked with each other, the base has a substrate through hole formed through the bottom thereof, the driving unit further comprises a reflection part circuit board fixed in the substrate through hole, and the first driving coil and the second driving coil are electrically connected to the reflection part circuit board.

9. The reflection driving mechanism according to claim 7, wherein the first coil-magnet pair and the second coil-magnet pair are arranged symmetrically relative to a central axis set by the bearing body.

10. The reflection driving mechanism according to claim 9, wherein a combined force of a first force acting on the bearing seat generated by the first coil-magnet pair and a second force acting on the bearing seat generated by the second coil-magnet pair determines the movement of the bearing seat relative to the support frame, and the difference between a first torque acting on the bearing seat generated by the first coil-magnet pair and a second torque acting on the bearing seat generated by the second coil-magnet pair determines the movement of the bearing seat and the support frame as a whole relative to the reflection drive housing.

11. The reflection driving mechanism according to claim 7, wherein the reflection driving mechanism further comprises a reflection part magnetic attraction component for attracting the bearing seat and the support frame to the reflection drive housing, wherein the reflection part magnetic attraction component comprises a frame magnetic attraction magnet fixed to the support frame and a reflection part magnetic conductive sheet arranged on the reflection drive housing, so that the support frame is attracted to the reflection drive housing through the magnetic attraction force between the frame magnetic attraction magnet and the reflection part magnetic conductive sheet and the magnetic attraction force between the first and second driving magnets and the reflection part magnetic conductive sheet, and the bearing seat is attracted to the reflection drive housing through the magnetic attraction force between the first and second driving magnets and the reflection part magnetic conductive sheet.

12. The reflection driving mechanism according to claim 7, wherein the driving unit further comprises a third driving magnet disposed on the bearing seat and located between the first driving magnet and the second driving magnet, and a third driving coil disposed on the reflection drive housing and corresponding to the third driving magnet, wherein the third driving coil is located between the first driving coil and the second driving coil, wherein the third driving coil and the third driving magnet constitute a third coil-magnet pair.

13. The reflection driving mechanism according to claim 12, wherein the third coil-magnet pair is suitable for driving the bearing seat to rotate relative to the support frame around the first axis, and the first coil-magnet pair and the second coil-magnet pair are suitable for cooperating to drive the bearing seat to rotate relative to the reflection drive housing around the second axis so as to drive the support frame to rotate around the second axis relative to the reflection drive housing through the pivot connection between the bearing seat and the support frame.

14. The reflection driving mechanism according to claim 13, wherein the difference between a first torque generated by the first coil-magnet pair acting on the bearing seat and a second torque generated by the second coil-magnet pair acting on the bearing seat determines the movement of the bearing seat and the support frame as a whole relative to the reflection drive housing, wherein the direction of a first force acting on the bearing seat generated by the first coil-magnet pair is opposite to the direction of a second force acting on the bearing seat generated by the second coil-magnet pair.

15. The reflection driving mechanism according to claim 14, wherein the magnitude of the first force is equal to the magnitude of the second force.

16. The reflection driving mechanism according to claim 1, wherein the first spring wire is provided with a first spring wire rotation axis, and the first spring wire is symmetrical about the first spring wire rotation axis; the second spring wire is provided with a second spring wire rotation axis, and the second spring wire is symmetrical about the second spring wire rotation axis; wherein the first spring wire rotation axis and the second spring wire rotation axis are in the same direction as the first axis.

17. A camera module, comprising:

a reflection driving mechanism, comprising:

a reflection drive housing having a receiving cavity formed therein and a light inlet and a light outlet communicated with the receiving cavity;

a rotation support assembly;

a support frame, which is rotatably mounted in the receiving cavity through the rotation support assembly, wherein the support frame has at least one support groove recessedly formed on its top surface;

a bearing seat rotatably mounted on the support frame, wherein the bearing seat comprises a bearing body and at least one rotation shaft protruding and extending laterally from the bearing body, the bearing body has a mounting portion suitable for mounting a reflective element thereon, and the at least one rotation shaft is fittedly mounted in the at least one support groove, so that the bearing seat can rotate relative to the support frame through the pivot connection between the at least one rotation shaft and the at least one support groove; and a driving unit, wherein the driving unit is suitable for driving the bearing seat to rotate relative to the support frame around a first axis set by the at least one rotation shaft, and the driving unit is suitable for driving the bearing seat to rotate relative to the reflection drive housing around a second axis perpendicular to the first axis so as to drive the support frame to rotate relative to the reflection drive housing around the second axis through the pivot connection between the bearing seat and the support frame;

wherein the reflection driving mechanism further comprises a spring sheet comprising an outer fixing portion fixed to the top surface of the support frame, an inner fixing portion fixed to the top surface of the bearing seat, and a spring wire portion extending between the inner fixing portion and the outer fixing portion;

wherein the bearing seat is centrally held in the support frame by the spring sheet;

wherein the outer fixing portion comprises a first outer fixing portion, a second outer fixing portion, a third outer fixing portion and a fourth outer fixing portion, the inner fixing portion comprises a first inner fixing portion, a second inner fixing portion, a third inner fixing portion and a fourth inner fixing portion, and the spring wire portion comprises a first spring wire and a second spring wire, wherein the first outer fixing portion and the second outer fixing portion are fixed to a side of the top surface of a first support portion of the support frame, the first inner fixing portion and the second inner fixing portion are fixed to a side of the top surface of the bearing seat, and the first spring wire connects the first outer fixing portion, the second outer fixing portion, the first inner fixing portion and the second inner fixing portion to form a first spring sheet part; the third outer fixing portion and the fourth outer fixing portion are fixed to the opposite side of the top surface of a second support portion of the support frame, the third inner fixing portion and the fourth inner fixing portion are fixed to the opposite side of the top surface of the bearing seat, and the second spring wire connects the third outer fixing portion, the fourth outer fixing portion, the third inner fixing portion and the fourth inner fixing portion to form a second spring sheet part, wherein the first spring sheet part and the second spring sheet part are arranged symmetrically with respect to the second axis;

the reflective element mounted on the reflection driving mechanism;

a lens module held on a light reflection path of the reflective element; and a photosensitive assembly arranged on a light propagation path of the lens module.

* * * * *